US012596774B2

(12) United States Patent
Roman et al.

(10) Patent No.: US 12,596,774 B2
(45) Date of Patent: Apr. 7, 2026

(54) USER INTERFACES FOR ACCOUNT MANAGEMENT

(71) Applicant: Apple Inc., Cupertino, CA (US)

(72) Inventors: Peter W. Roman, Los Altos, CA (US);
Natalie Calvert, Pacifica, CA (US);
Elizabeth C. Cranfill, San Francisco,
CA (US); Roberto Garcia, Los Gatos,
CA (US); Marcello Luppi, The Hague
(NL); Austin A. Marusco, Georgetown,
TX (US); Kevin C. Milden, San Jose,
CA (US); Elizabeth K. Plageman,
Santa Cruz, CA (US); Lukman Sanusi,
Cupertino, CA (US); **Christopher G.
Skogen**, Los Altos Hills, CA (US);
Adam W. Ward, San Diego, CA (US)

(73) Assignee: Apple Inc., Cupertino, CA (US)

( * ) Notice: Subject to any disclaimer, the term of this
patent is extended or adjusted under 35
U.S.C. 154(b) by 351 days.

(21) Appl. No.: 18/200,355

(22) Filed: May 22, 2023

(65) Prior Publication Data

US 2023/0394123 A1     Dec. 7, 2023

Related U.S. Application Data

(60) Provisional application No. 63/349,062, filed on Jun.
4, 2022.

(51) Int. Cl.
G06F 3/0482     (2013.01)
G06F 3/04847    (2022.01)
G06F 21/31      (2013.01)

(52) U.S. Cl.
CPC ............ G06F 21/31 (2013.01); G06F 3/0482
(2013.01); G06F 3/04847 (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 9,875,346 B2 * | 1/2018 | Pitschel | ............... G06F 21/305 |
| 10,558,546 B2 * | 2/2020 | Cranfill | ................. H04L 63/102 |
| 10,572,842 B1 * | 2/2020 | To | ........................ G06Q 30/00 |
| 11,398,999 B1 * | 7/2022 | Shrestha | ........... G08B 21/0269 |
| 2002/0049806 A1 * | 4/2002 | Gatz | ...................... G06F 21/62 |
| | | | 709/224 |
| 2002/0138844 A1 * | 9/2002 | Otenasek | ........... H04N 7/17336 |
| | | | 345/530 |
| 2005/0022234 A1 * | 1/2005 | Strothman | ......... H04N 21/4751 |
| | | | 725/35 |
| 2005/0144297 A1 * | 6/2005 | Dahlstrom | ............ H04L 63/101 |
| | | | 709/229 |

(Continued)

OTHER PUBLICATIONS

International Preliminary Report on Patentability received for PCT
Patent Application No. PCT/US2023/023924, mailed on Dec. 19,
2024, 9 pages.

(Continued)

*Primary Examiner* — Daniel Rodriguez
(74) *Attorney, Agent, or Firm* — YHE Law LLP

(57) ABSTRACT

The present disclosure generally relates to user interfaces for
managing user accounts. Initiating a process to create a user
account and displaying an access-setting user interface that
includes a plurality of selectable and customizable options
for setting content access criteria.

33 Claims, 29 Drawing Sheets

(56) References Cited

U.S. PATENT DOCUMENTS

| | | | | |
|---|---|---|---|---|
| 2006/0173749 | A1* | 8/2006 | Ward | G06Q 30/06 |
| | | | | 705/26.8 |
| 2007/0055754 | A1* | 3/2007 | Robbin | H04L 63/102 |
| | | | | 709/223 |
| 2009/0227232 | A1* | 9/2009 | Matas | H04M 1/665 |
| | | | | 455/411 |
| 2009/0300671 | A1 | 12/2009 | Scott et al. | |
| 2010/0031193 | A1* | 2/2010 | Stark | G11B 27/34 |
| | | | | 715/810 |
| 2011/0236872 | A1* | 9/2011 | Taylor | G06Q 10/06 |
| | | | | 434/350 |
| 2012/0265803 | A1* | 10/2012 | Ha | G06F 16/9574 |
| | | | | 709/203 |
| 2013/0097644 | A1* | 4/2013 | Brande | H04N 21/8586 |
| | | | | 725/93 |
| 2013/0104246 | A1* | 4/2013 | Bear | G06F 21/6218 |
| | | | | 726/28 |
| 2013/0218973 | A1* | 8/2013 | Good | H04L 67/306 |
| | | | | 709/204 |
| 2013/0219517 | A1* | 8/2013 | Yerli | G06F 21/31 |
| | | | | 726/28 |
| 2013/0224705 | A1* | 8/2013 | Skelton | G06F 3/04842 |
| | | | | 434/238 |
| 2014/0164242 | A1* | 6/2014 | Lei | G06F 21/30 |
| | | | | 705/44 |
| 2014/0283142 | A1* | 9/2014 | Shepherd | G06F 3/04817 |
| | | | | 726/30 |
| 2015/0348032 | A1* | 12/2015 | Ioveva | G06Q 20/2295 |
| | | | | 705/44 |
| 2015/0348185 | A1* | 12/2015 | Frost | G06Q 20/227 |
| | | | | 705/35 |
| 2016/0026717 | A1 | 1/2016 | Kelsey et al. | |
| 2016/0092076 | A1* | 3/2016 | Yenigalla | G06F 3/04842 |
| | | | | 715/716 |
| 2017/0149795 | A1* | 5/2017 | Day, II | H04L 63/108 |
| 2017/0180287 | A1* | 6/2017 | Patel | H04W 12/02 |
| 2017/0308593 | A1* | 10/2017 | Jeon | G06F 16/9535 |
| 2020/0213326 | A1* | 7/2020 | Herman | H04L 51/10 |

OTHER PUBLICATIONS

International Search Report and Written Opinion received for PCT Patent Application No. PCT/US2023/023924, mailed on Aug. 18, 2023, 13 pages.

The Wayback Machine, "Create a Google Account for Your Child", Retrieved from: https://web.archive.org/web/20220531112031/https://support.google.com/families/answer/7103338?hl=en#zippy=%2Con-other-devices-and-computers, 2022, 1 page.

The Wayback Machine, "Spending limits in Family Safety", Retrieved from: https://web.archive.org/web/20220526122159/https://support.microsoft.com/en-us/account-billing/spending-limits-in-family-safety-f30d6801-165d-9f86-3fe7-063245c0449b, 2022, 3 pages.

Microsoft, "Add People to Your Family Group", Retrieved from: https://support.microsoft.com/en-us/account-billing/add-people-to-your-family-group-4a07b974-8103-16ad-6ea2-46549ca19e03, 2022, pp. 2-5.

Orphanides, KG., "How to Configure Parental Controls in Microsoft Family Safety", Retrieved from: https://web.archive.org/web/20220517054050/https://www.trustedreviews.com/how-to/how-to-configure-parental-controls-in-microsoft-family-safety-4215164, 2022, 18 pages.

* cited by examiner

Portable Multifunction Device 100

210

212

206

208

200

Speaker 111

Optical Sensor 164

Proximity Sensor 166

210 is SIM card slot
212 is headphone jack

208

202

Touch Screen 112

Contact Intensity Sensor(s) 165

Tactile Output Generator(s) 167

203

Microphone 113

Home 204

Accelerometer(s) 168

External Port 124

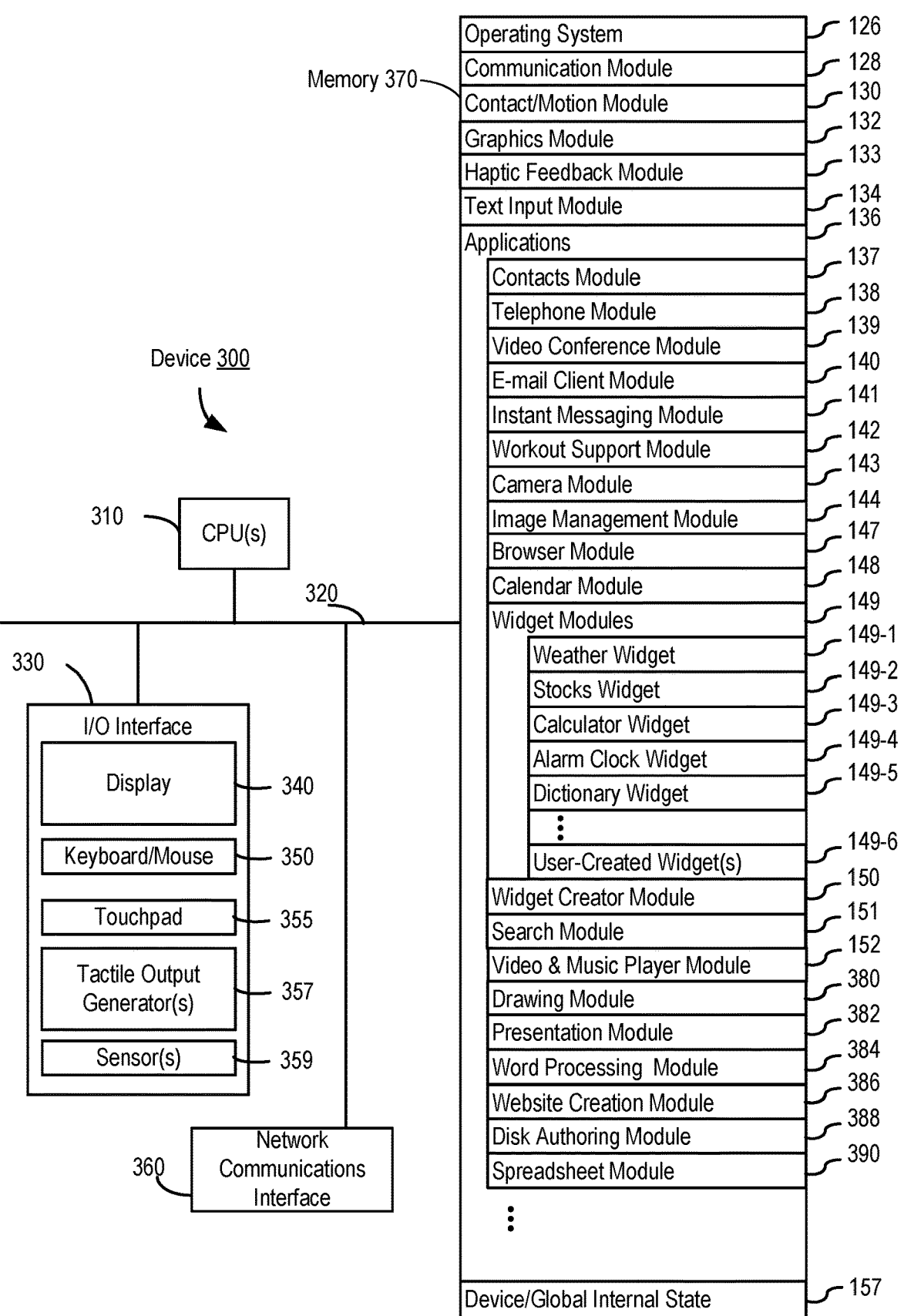

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |

Memory 370

Device 300

310 — CPU(s)

320

330

| I/O Interface | |
|---|---|
| Display | 340 |
| Keyboard/Mouse | 350 |
| Touchpad | 355 |
| Tactile Output Generator(s) | 357 |
| Sensor(s) | 359 |

360 — Network Communications Interface

| | |
|---|---|
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

*FIG. 3*

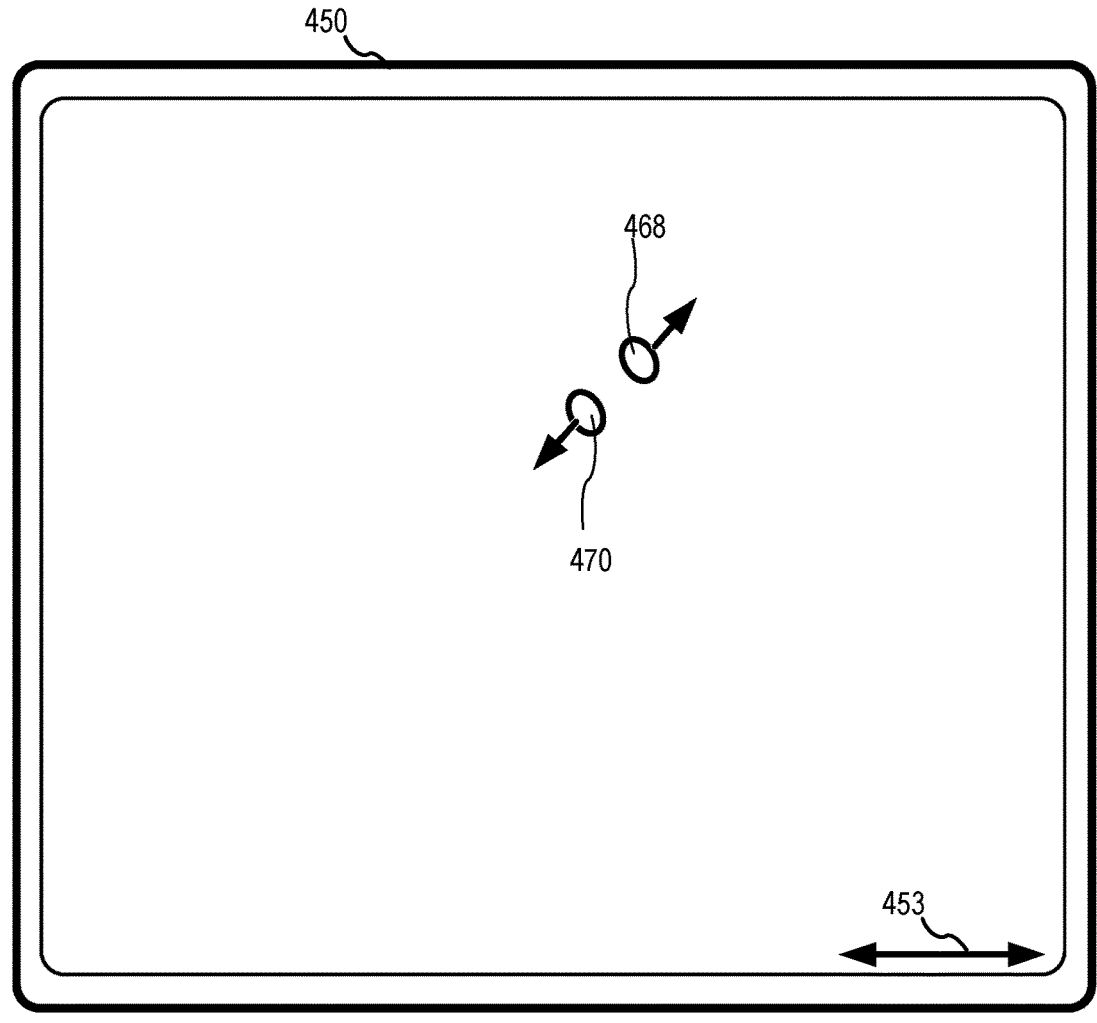
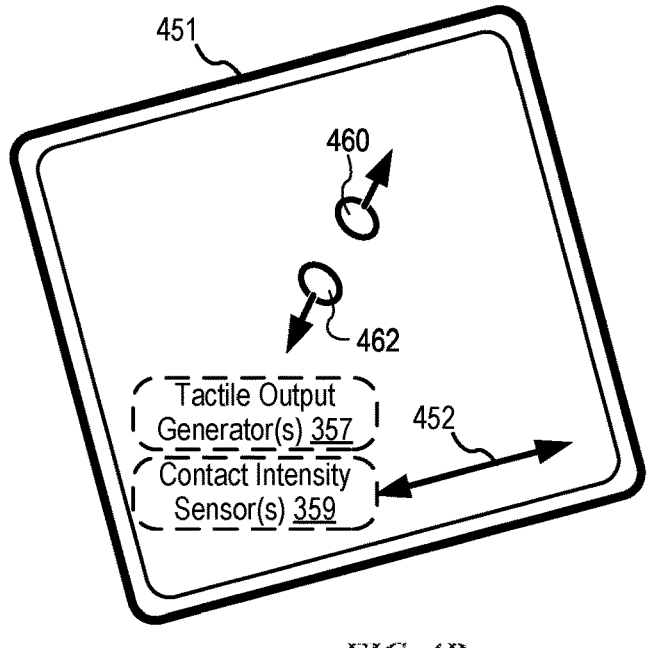
*FIG. 4B*

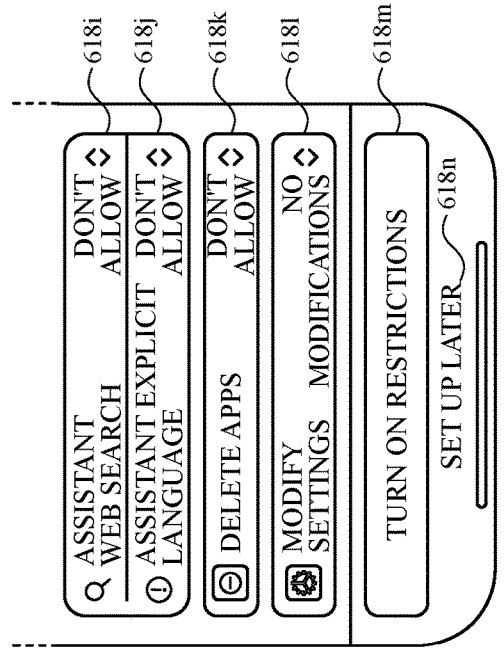

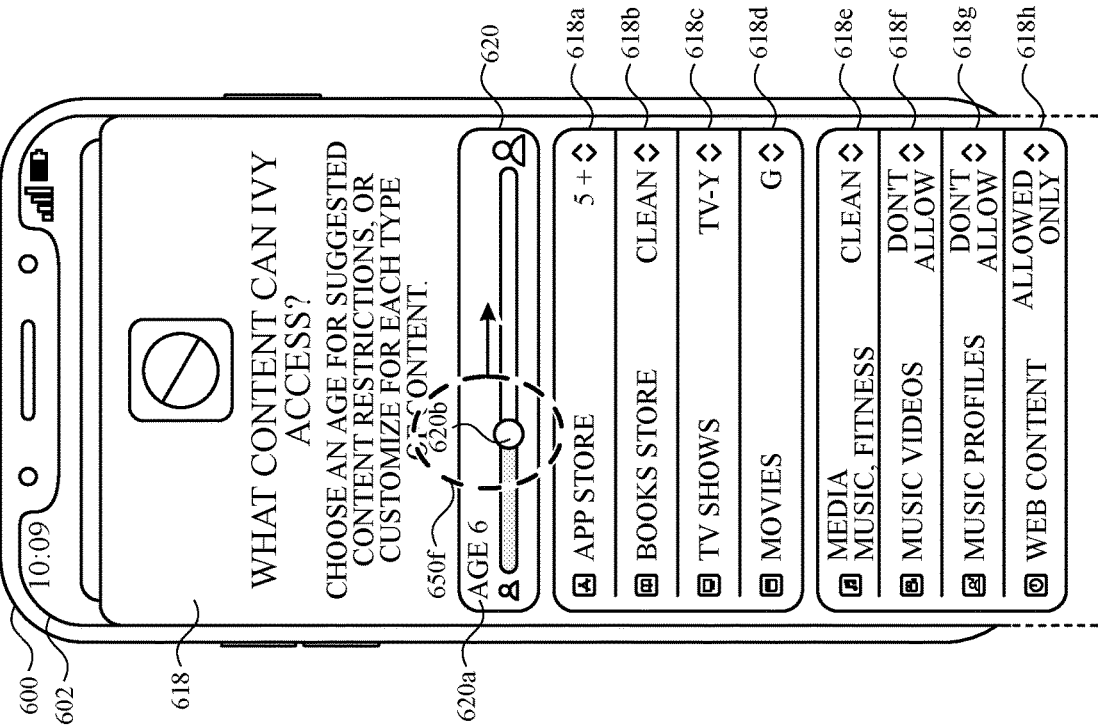

WHAT CONTENT CAN IVY ACCESS?

CHOOSE AN AGE FOR SUGGESTED CONTENT RESTRICTIONS, OR CUSTOMIZE FOR EACH TYPE OF CONTENT.

AGE 6

| | | |
|---|---|---|
| APP STORE | 5 + ◇ | 618a |
| BOOKS STORE | CLEAN ◇ | 618b |
| TV SHOWS | TV-Y ◇ | 618c |
| MOVIES | G ◇ | 618d |
| MEDIA MUSIC, FITNESS | CLEAN ◇ | 618e |
| MUSIC VIDEOS | DON'T ALLOW ◇ | 618f |
| MUSIC PROFILES | DON'T ALLOW ◇ | 618g |
| WEB CONTENT | ALLOWED ONLY ◇ | 618h |
| ASSISTANT WEB SEARCH | DON'T ALLOW ◇ | 618i |
| ASSISTANT EXPLICIT LANGUAGE | DON'T ALLOW ◇ | 618j |
| DELETE APPS | DON'T ALLOW ◇ | 618k |
| MODIFY SETTINGS | NO MODIFICATIONS ◇ | 618l |

TURN ON RESTRICTIONS    618m

SET UP LATER    618n

*FIG. 6F*

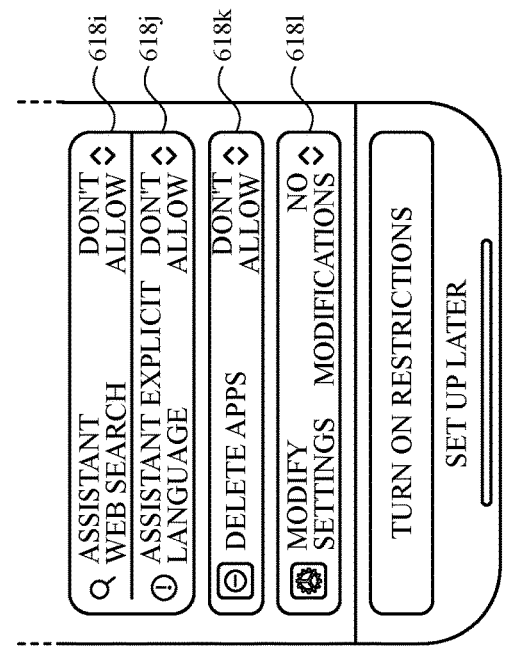
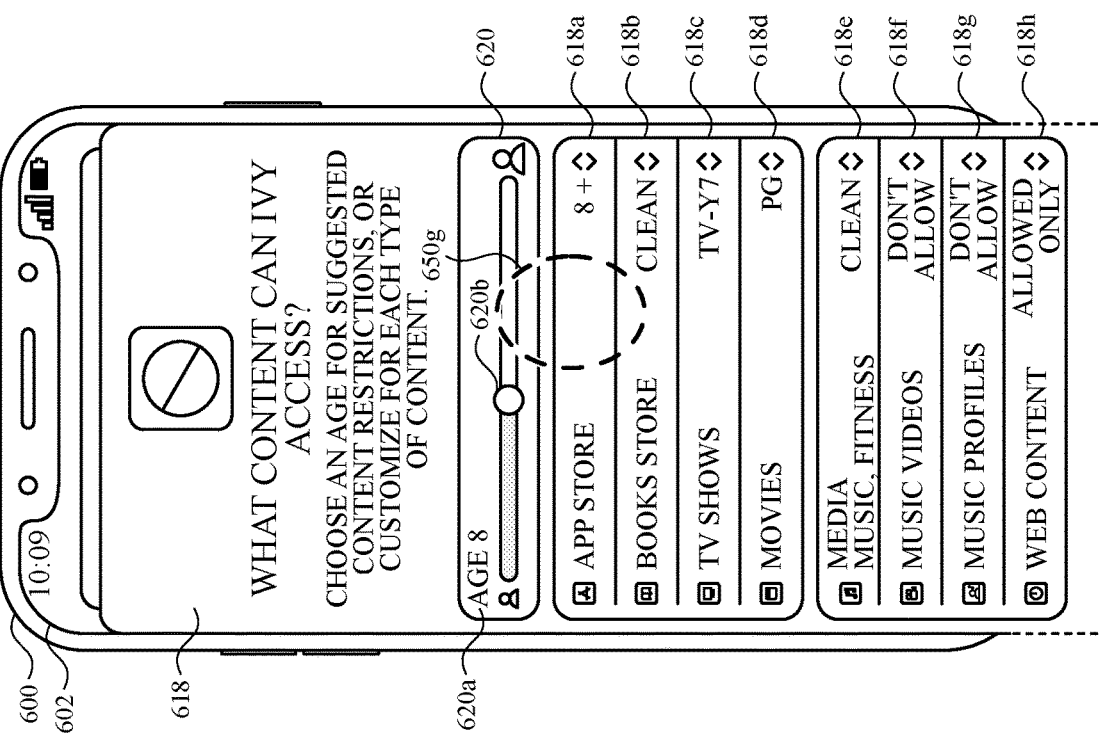
*FIG. 6G*

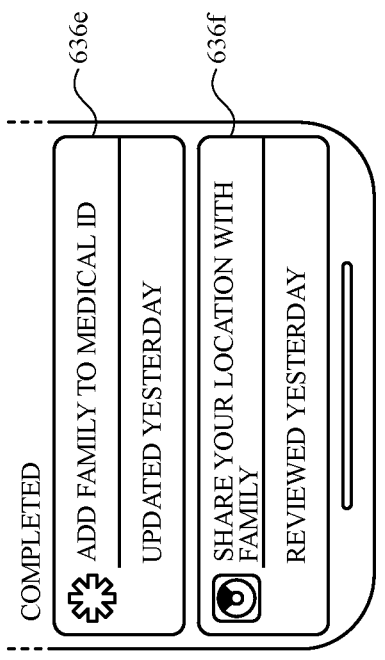
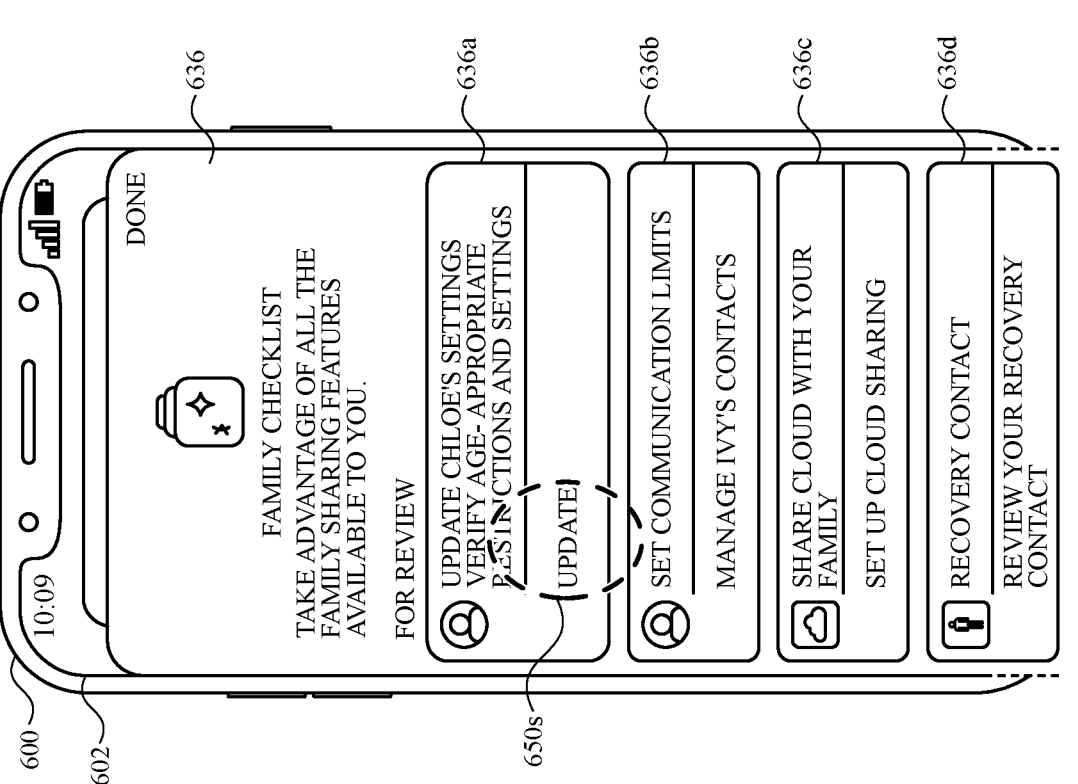
*FIG. 6S*

700 ⬎

702
While a first user account is active on the computer system, detect, via the one or more input devices, a first set of one or more inputs corresponding to a request to initiate a process to create a second user account.

704
In response to the first set of one or more inputs, initiate the process to create the second user account.

706
During the process to create the second user account:

708
Display, via the display generation component, an access-setting user interface that includes a plurality of selectable options for setting content access criteria, wherein the access-setting user interface includes:

710
A first selectable option of the plurality of selectable options that corresponds to a first set of content access criteria

712
A second selectable option of the plurality of selectable age options that corresponds to a second set of content access criteria, different from the first set of content access criteria

714
A first indication of a currently selected content access level for a first type of content

716
While the first selectable option is selected and while the first indication indicates that the first type of content has a first access level that is based on the first set of content access criteria, detect, via the one or more input devices, a second set of one or more inputs that includes a first input corresponding to selection of the second selectable option.

718
In response to the second set of one or more inputs:

720
Select the second selectable option.

722
Modify the first indication to indicate a second access level, different from the first access level, for the first type of content, wherein the second access level is based on the second set of content access criteria.

*FIG. 7*

USER INTERFACES FOR ACCOUNT MANAGEMENT

CROSS-REFERENCE TO RELATED APPLICATIONS

This application claims priority to U.S. Provisional Patent Application No. 63/349,062, entitled "USER INTERFACES FOR ACCOUNT MANAGEMENT," filed Jun. 4, 2022, the content of which is hereby incorporated by reference in its entirety.

FIELD

The present disclosure relates generally to computer user interfaces, and more specifically to techniques for managing user accounts.

BACKGROUND

Personal electronic devices allow users to view and manage user accounts. Some personal electronic devices include the ability for users to create user accounts for themselves or for another user. Some personal electronic devices include the ability for users to manage user accounts.

BRIEF SUMMARY

Some techniques for managing user accounts using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing user accounts. Such methods and interfaces optionally complement or replace other methods for managing user accounts. Such methods and interfaces reduce the cognitive burden on a user and produce a more efficient human-machine interface. For battery-operated computing devices, such methods and interfaces conserve power and increase the time between battery charges.

In accordance with some embodiments, a method, performed at a computer system that is in communication with a display generation component and one or more input devices is described. The method comprises: while a first user account is active on the computer system, detecting, via the one or more input devices, a first set of one or more inputs corresponding to a request to initiate a process to create a second user account; in response to the first set of one or more inputs, initiating the process to create the second user account; during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while a first user account is active on the computer system, detecting, via the one or more input devices, a first set of one or more inputs corresponding to a request to initiate a process to create a second user account; in response to the first set of one or more inputs, initiating the process to create the second user account; during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while a first user account is active on the computer system, detecting, via the one or more input devices, a first set of one or more inputs corresponding to a request to initiate a process to create a second user account; in response to the first set of one or more inputs, initiating the process to create the second user account; during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: while a first user account is active on the computer system, detecting, via the one or more input devices, a first set of one or more inputs corresponding to a request to initiate a process to create a second user account; in response to the first set of one or more inputs, initiating the process to create the second user account; during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

In accordance with some embodiments, a computer system that is configured to communicate with a display generation component and one or more input devices is described. The computer system comprises: means for, while a first user account is active on the computer system, detecting, via the one or more input devices, a first set of one or more inputs corresponding to a request to initiate a process to create a second user account; means for, in response to the first set of one or more inputs, initiating the process to create the second user account; means for, during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

In accordance with some embodiments, a computer program product is described. The computer program product comprises one or more programs configured to be executed by one or more processors of a computer system that is in communication with a display generation component and one or more input devices. The one or more programs include instructions for: while a first user account is active on the computer system, detecting, via the one or more input devices, a first set of one or more inputs corresponding to a request to initiate a process to create a second user account; in response to the first set of one or more inputs, initiating the process to create the second user account; during the process to create the second user account: displaying, via the display generation component, an access-setting user interface that includes a plurality of selectable options for setting content access criteria, wherein the access-setting user interface includes: a first selectable option of the plurality of selectable options that corresponds to a first set of content access criteria; and a second selectable option of the plurality of selectable age options that corresponds to a second set of content access criteria, different from the first set of content access criteria; and a first indication of a currently selected content access level for a first type of content; while the first selectable option is selected and while the first indication indicates that the first type of content has a first access level that is based on the first set of content access criteria, detecting, via the one or more input devices, a second set of one or more inputs that includes a first input corresponding to selection of the second selectable option; and in response to the second set of one or more inputs: selecting the second selectable option; and modifying the first indication to indicate a second access level, different from the first access level, for the first type of content, wherein the second access level is based on the second set of content access criteria.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing user accounts, thereby increasing the effectiveness, efficiency, and user satisfaction with such devices. Such methods and interfaces may complement or replace other methods for managing user accounts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 3 is a block diagram of an exemplary multifunction device with a display and a touch-sensitive surface in accordance with some embodiments.

FIG. 4B illustrates an exemplary user interface for a multifunction device with a touch-sensitive surface that is separate from the display in accordance with some embodiments.

FIG. 7 illustrates a flowchart of a process for managing user accounts in accordance with some embodiments.

DESCRIPTION OF EMBODIMENTS

Figure 1A:
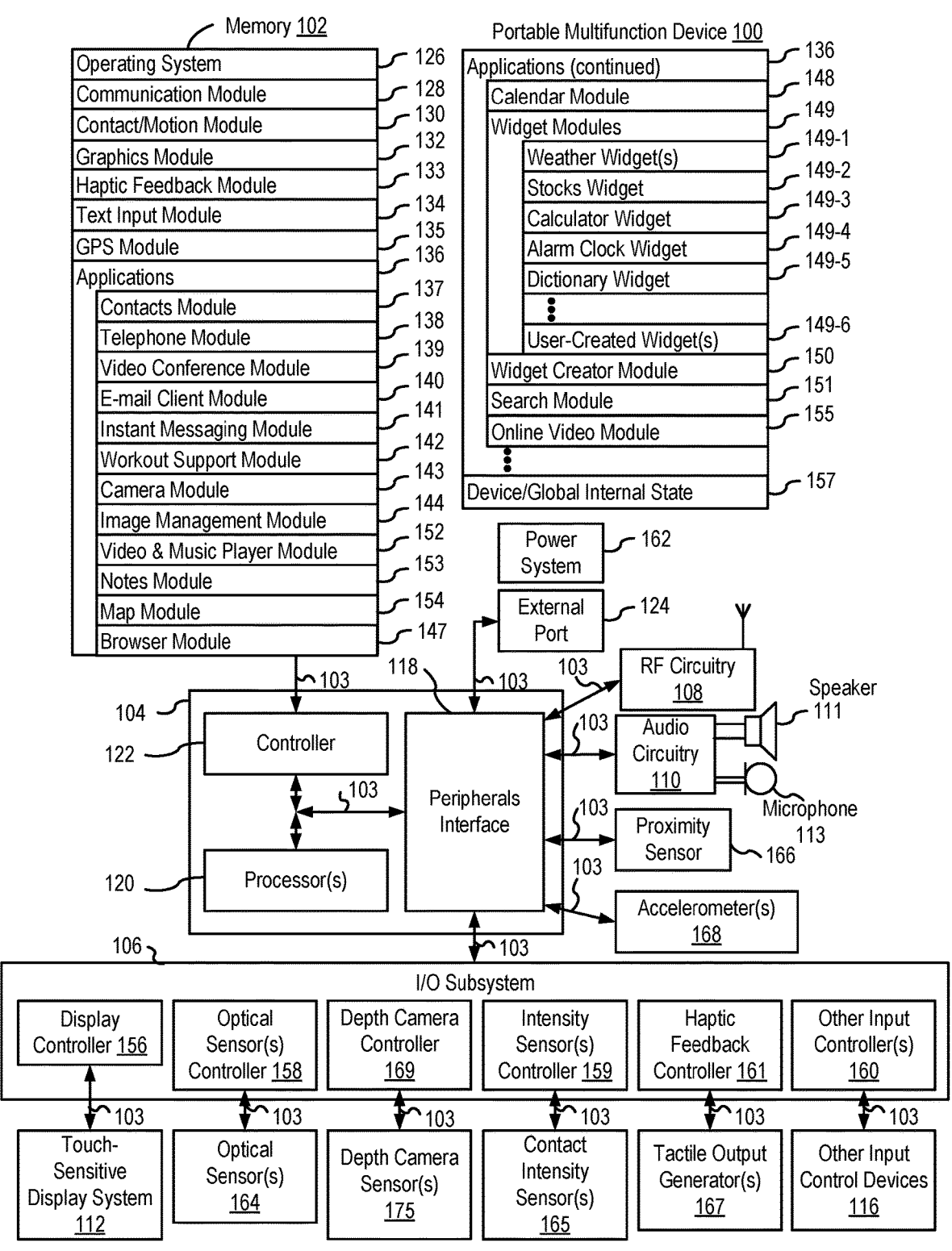
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing user accounts. Such techniques can reduce the cognitive burden on a user who manages other user accounts, including shared accounts and user accounts with restricted settings, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6AF illustrate exemplary user interfaces for managing user accounts. FIG. 7 is a flow diagram illustrating methods of managing user accounts in accordance with some embodiments. The user interfaces in FIGS. 6A-6AF are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
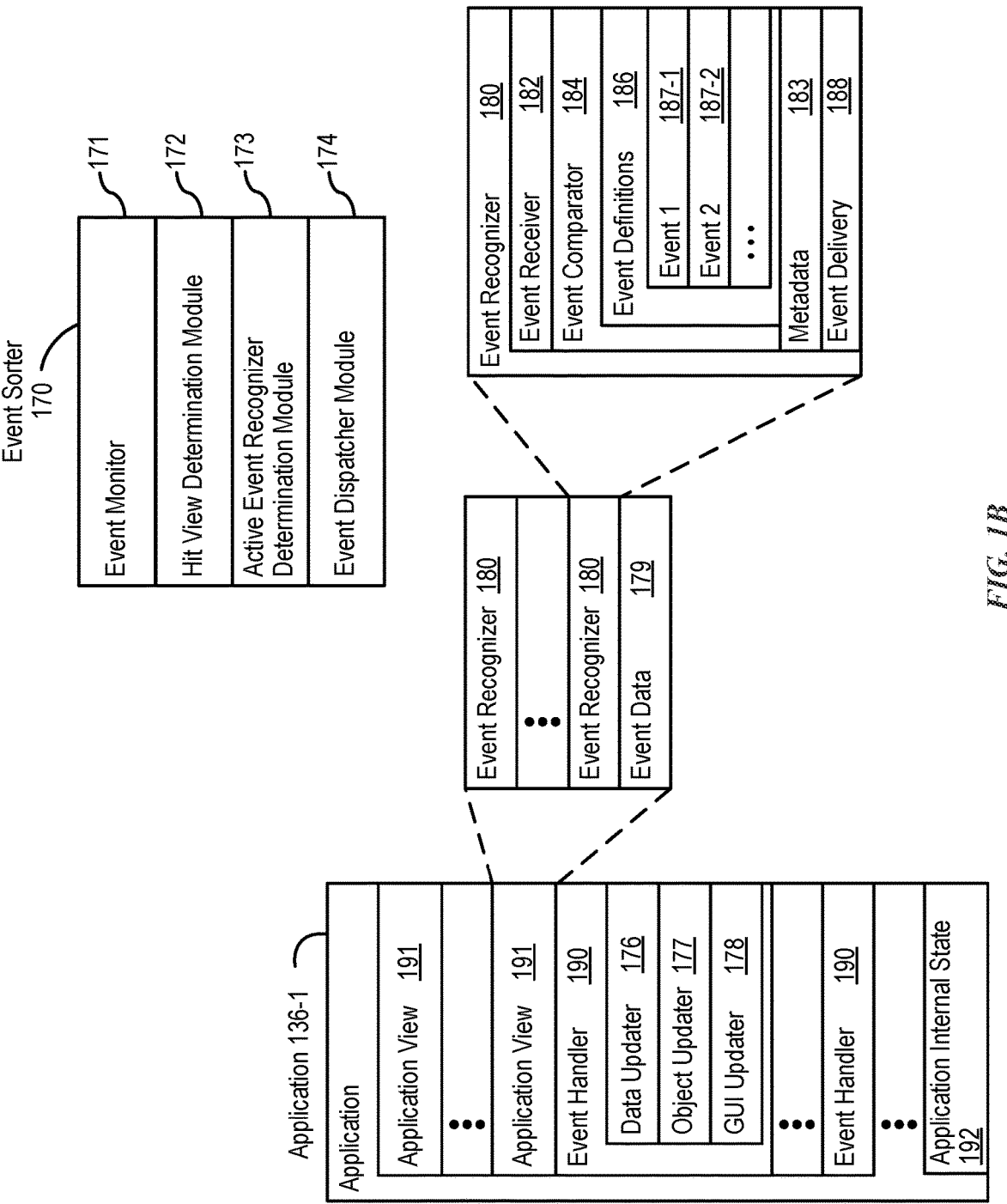
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
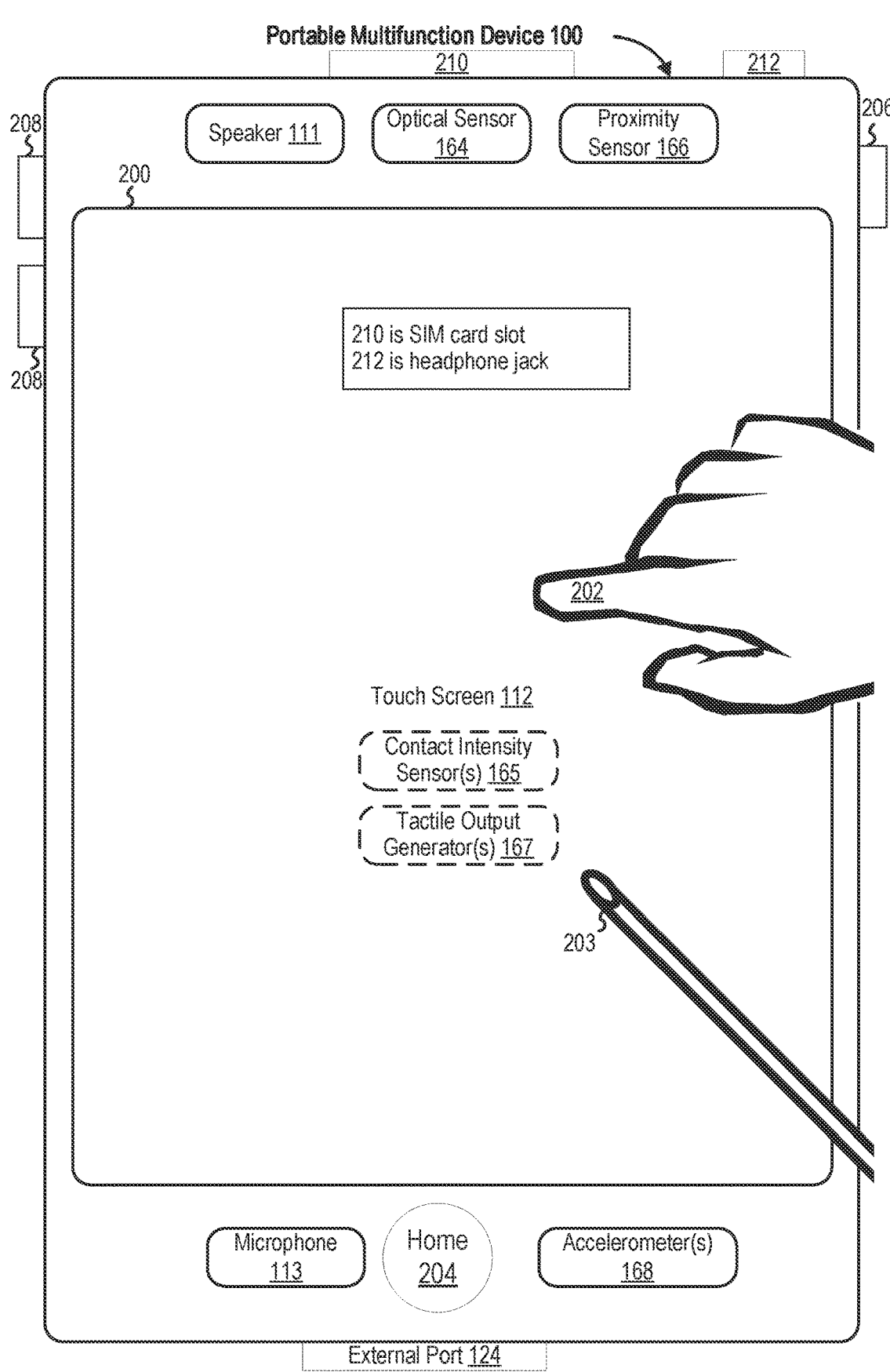
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
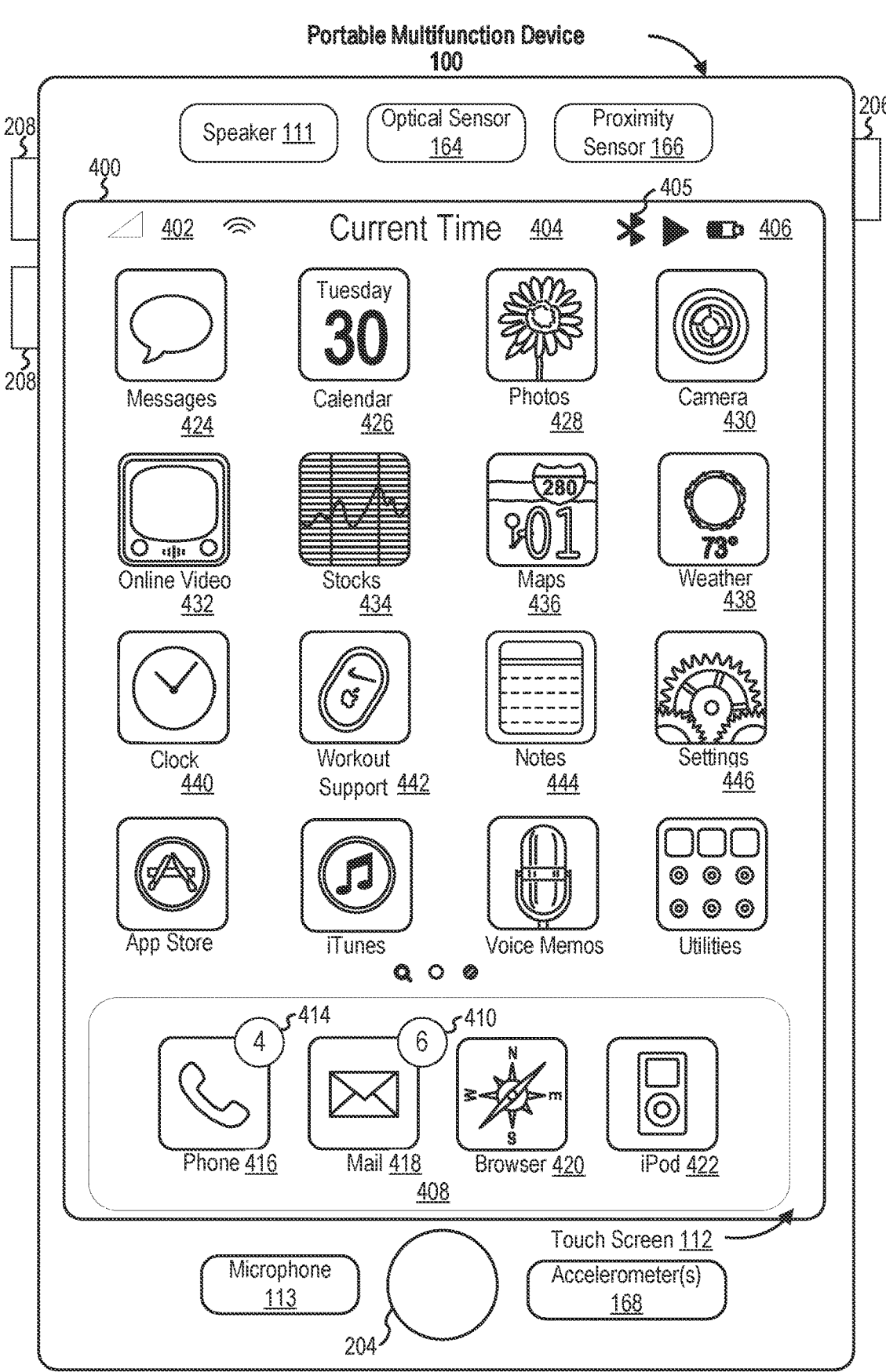
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
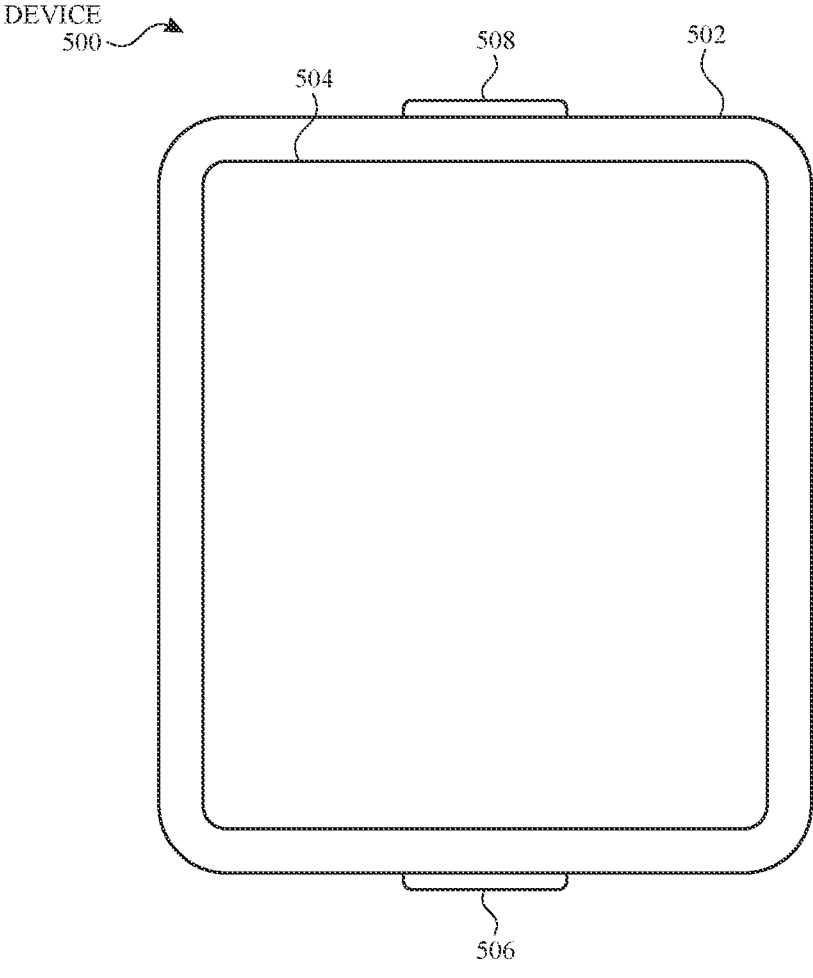
FIG. 5A illustrates a personal electronic device in accordance with some embodiments.
Figures 6A, 6B:
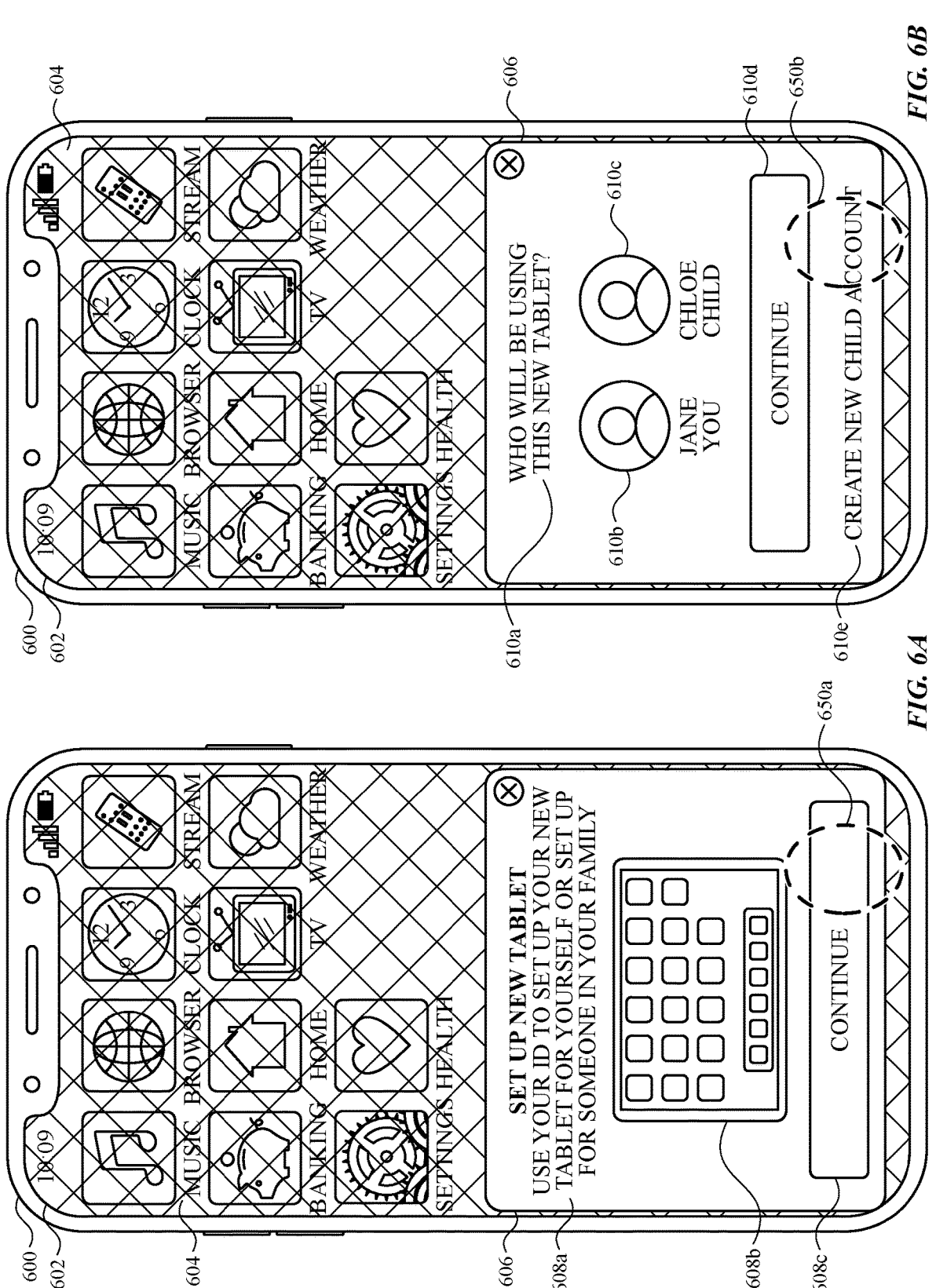
FIGS. 6A-6AF illustrate exemplary user interfaces for managing user accounts in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
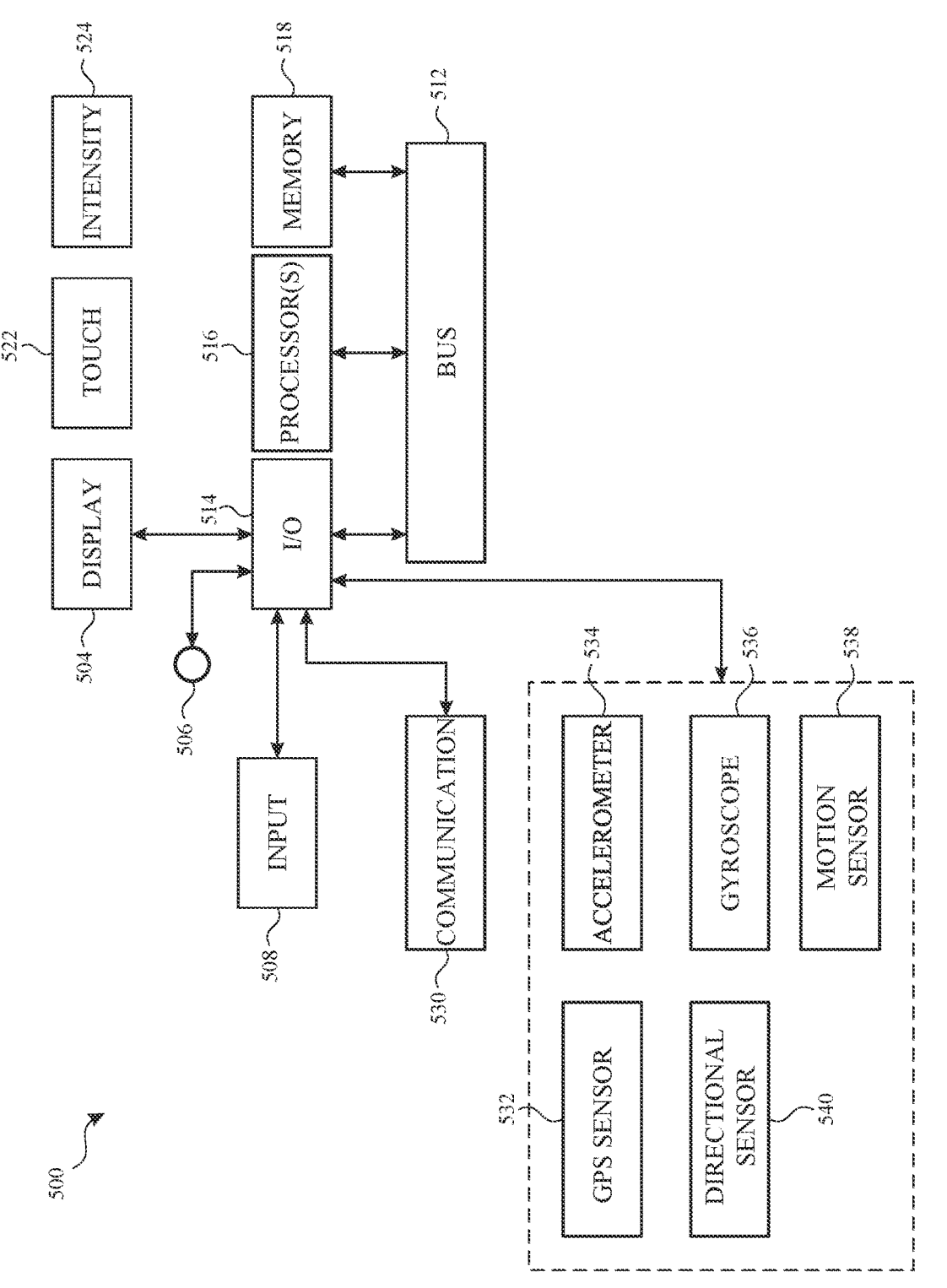
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 65 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces for managing user accounts, in accordance with some embodiments. The user interfaces in these figures are used to illustrate the processes described below, including the processes in FIG. 7.

FIG. 6A illustrates device 600 (e.g., a smart phone, a device having one or more features of device 100, 300, and/or 500) with display 602 (e.g., a touchscreen display). Device 600 displays, on display 602, home screen user interface 604, with various selectable application icons and set up prompt 606 overlaid on home screen user interface 604. In some embodiments, set up prompt 606 is displayed after device 600 detects, via a wireless communication method (e.g., Wi-Fi, Bluetooth, near field communication (NFC), cellular, and/or other wireless communication techniques), an external device (e.g., a smart tablet) that has initiated a set up process. Set up prompt 606 includes instructional text 608a, graphical representation 608b (e.g., a smart tablet) of the external device in the process of being set up, and continue affordance 608c. Device 600 detects input 650a (e.g., a tap input) corresponding to selection of continue affordance 608c.

In response to detecting input 650a, device 600 updates set up prompt 606, as shown in FIG. 6B. In FIG. 6B, set up prompt 606 now includes user prompt 610a, first user option 610b (e.g., "Jane"), second user option 610c (e.g., "Chloe"), continue affordance 610d, and new account affordance 610e (e.g., "create new child account"). In some embodiments, first user option 610b (e.g., "Jane") and second user option 610c (e.g., "Chloe") are established user accounts suggested by device 600 for configuring the external device. In the present example, device 600 belongs to Jane (e.g., a primary user), and device 600 is logged into and configured for Jane's user account (e.g., a primary account). In some embodiments, the primary user (e.g., "Jane," and/or the user of the primary account associated with first user option 610b) has previously configured a managed user account (e.g., the user account associated with second user option 610c) for another user (e.g., "Chloe," a child of Jane, and/or a user younger than a predetermined age threshold (e.g., 18 years old, 14 years old) via a process similar to that described in detail with respect to FIGS. 6C-6M. In some embodiments, managed user accounts are connected to one or more primary accounts (e.g., "Jane," and/or a user account associated with a parent or guardian) and can therefore be managed via a device associated with the one or more primary accounts (e.g., device 600, and/or another device configured for a parent or guardian user account). In FIG. 6B, device 600 detects input 650b (e.g., a tap input) corresponding to selection of new account affordance 610e, and in response, device 600 initiates a process for creating a new managed account (e.g., a child account, and/or a user account associated with a child).

Figures 6C, 6D:
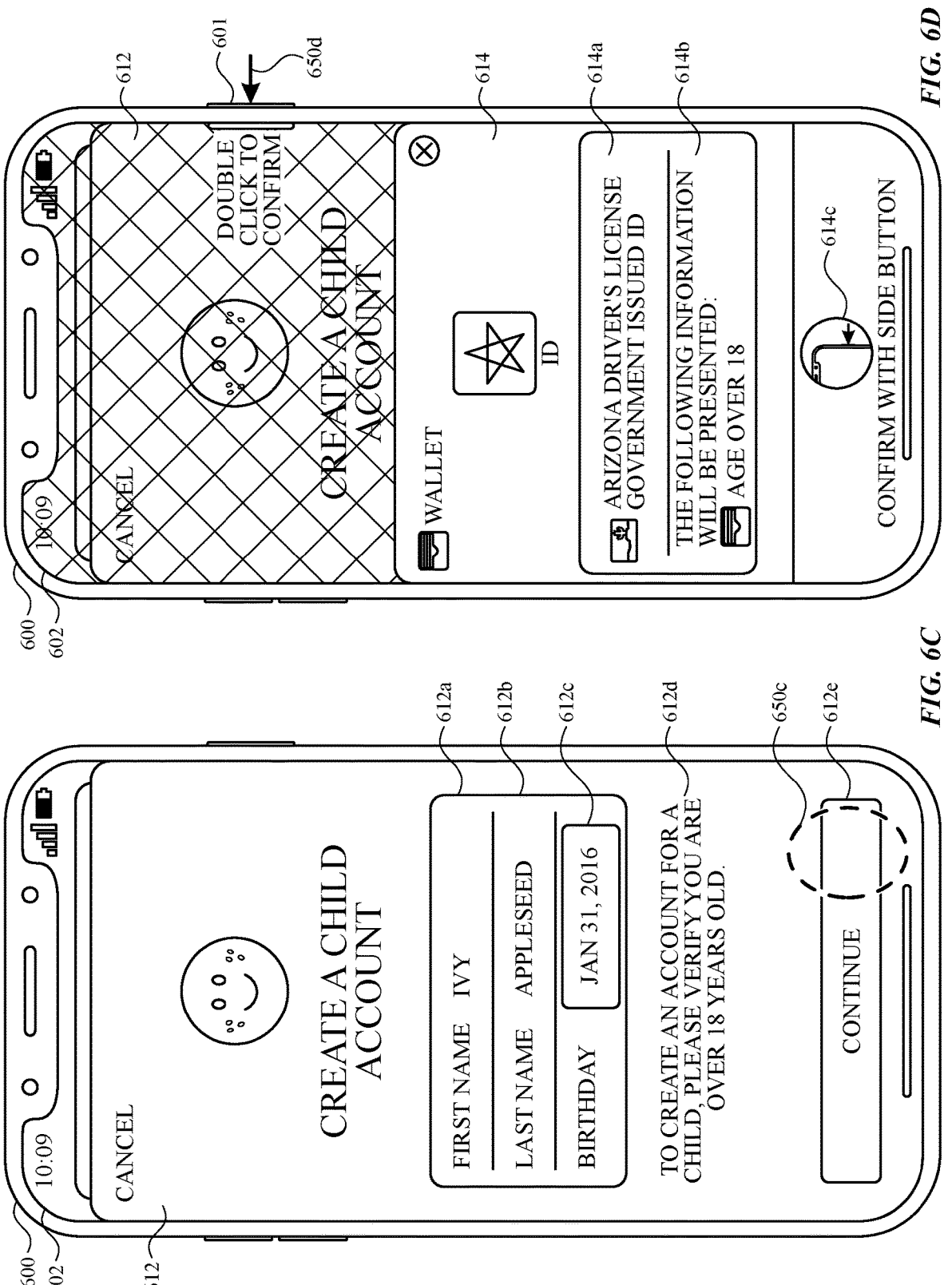

In FIG. 6C, in response to receiving input 650b, device 600 displays child account creation user interface 612 on display 602. Child account creation user interface 612 includes first name field 612a (e.g., "Ivy"), last name field 612b (e.g. "Appleseed"), and birthdate field 612c (e.g., "Jan. 31, 2016"). In some embodiments, first name field 612a, last name field 612b, and birthdate field 612c are initially displayed as incomplete (e.g., unfilled, and/or empty), and device 600 receives a set of one or more inputs (e.g., tap inputs) corresponding to selection of each field to present a keyboard and/or date selection affordance for completing each field. Child account creation user interface 612 further includes verification instructions 612d and continue affordance 612e. Device 600 detects input 650c (e.g., a tap) corresponding to selection of continue affordance 612e and, in response, initiates an age verification process by displaying verification user interface 614 overlaid on child account creation user interface 612 on display 602, as shown in FIG. 6D.

In FIG. 6D, verification user interface 614 includes digital verification method 614a, shared information text 614b, and confirmation affordance 614c. In some embodiments, digital verification (e.g., with a government issued identification document (e.g., driver's license, ID card, and/or passport)) has been configured on device 600 prior to display of verification user interface 614. Shared information text 614b details the information (e.g., "age over 18") that will be used as verification that the user engaging with device 600 (e.g., Jane) to create the child account is over 18 years old. Device 600 detects input 650d (e.g., a double-press input) at hardware button 601. In response to detecting input 650d at hardware button 601, device 600 continues the age verification process. In some embodiments, the age verification includes biometric authentication (e.g., facial recognition, fingerprint scan, and/or iris scan). In some embodiments, after successful biometric authentication, confirmation affordance 614c updates to show completion (e.g., transitions to a check mark) of the age verification process. In some embodiments, if biometric authentication is not successful, confirmation affordance 614c updates to show an error (e.g., with an exclamation point, and/or with an "X"). In some embodiments, if biometric authentication is not successful, device 600 displays a passcode entry user interface. In some embodiments, while displaying the passcode entry user interface, device 600 detects a series of one or more inputs corresponding to entering a passcode, and if the passcode is correct, device 600 completes the age verification process. After completion of the age verification process, device 600 continues the process for creating the managed account (e.g., child account, and/or user account associated with a child) by displaying account ID user interface 616, as shown in FIG. 6E.

Figure 6E:
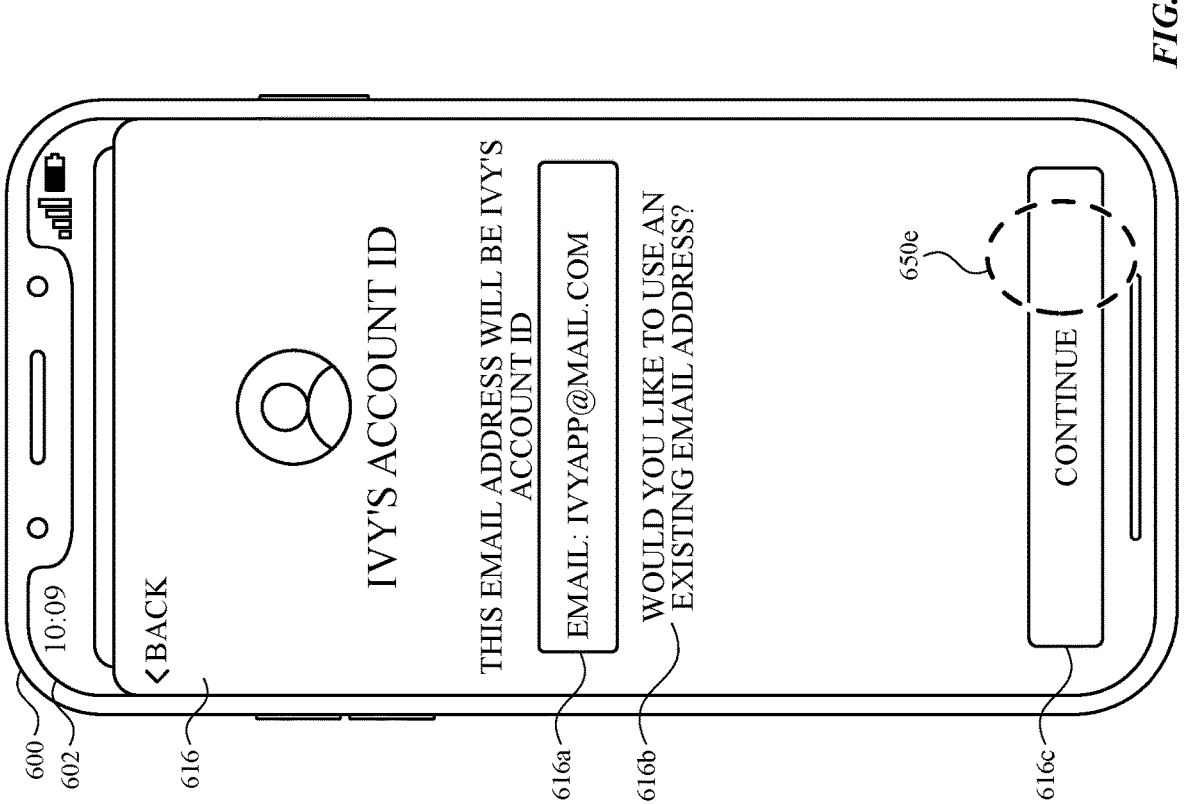

In FIG. 6E, device 600 displays account ID user interface 616 on display 602. Account ID user interface 616 includes email field 616a, which is prepopulated with suggested email address "ivyapp@mail.com" for the child account. In some embodiments, the prepopulated email address has been confirmed as an available (e.g., unused) email address that can be assigned to the new user account. In some embodiments, the prepopulated email address was selected (e.g., by device 600 and/or by an account management server) based on information provided during the child account creation process (e.g., the child's name and/or birthdate). Account ID user interface further includes selectable existing email affordance 616b. In some embodiments, device 600 detects a selection of existing email affordance 616b and, in response, clears email field 616a and displays a keyboard for entry of an existing email address to use for the child account. Device 600 receives input 650e (e.g., a tap input) corresponding to selection of continue affordance 616c. In response to selection of continue affordance 616c, device 600 continues the process for creating the managed account (e.g., child account, user account associated with a child) with the suggested email address as the account ID and displays managed account settings user interface 618 on display 602, as shown in FIG. 6F.

In FIG. 6F, device 600 displays, on display 602, managed account settings user interface 618. Managed account settings user interface 618 includes age region 620, selectable settings 618a-618l, turn on affordance 618m, and later affordance 618n. Settings 618a-618l are prepopulated with age-appropriate restrictions based on the birthdate entered in birthdate field 612c of FIG. 6C. The age-appropriate restrictions, such as "G" movies in setting 618d and "clean" language for books and media in settings 618b and 618e, respectively, dictate the content that can be accessed by the managed user account (e.g., child account) once configured. In some embodiments, the prepopulated age-appropriate restricted settings are determined based on a location (e.g., country, province, state, and/or city) of device 600 and/or the primary user account. In some embodiments, the age range (e.g., 5-7 years old, and/or 5-8 years old) associated with prepopulated age-appropriate restricted settings 618a-618l differ based on the location (e.g., country, province, state, and/or city) of device 600 and/or the primary user account.

Managed account settings user interface 618 of FIG. 6F further includes age region 620 that includes age indication 620a (e.g., at current "age 6") and age slider 620b. Device 600 detects input 650f (e.g., a swipe input) directed to moving age slider 620b to the right. In response to receiving input 650f, device 600 updates age region 620 and a set of one or more of settings 618a-618l, as shown in FIG. 6G.

In FIG. 6G, age region 620 is updated from "age 6" to "age 8" at age indication 620a and age slider 620b is displayed further to the right, indicating an increase in age from FIG. 6F. Settings 618a, 618c, and 618d are updated to age-appropriate restricted settings for an 8 year old child, such as "PG" movies in setting 618d. Setting 618b remain the same, "clean" for books, and settings 618e-618l remain the same as in FIG. 6F. In some embodiments, certain settings (e.g., "clean" for books) are predetermined for a particular age range (e.g., 4 years old to 12 years old) and will not update until age slider 620b is moved beyond the particular age range. In some embodiments, device 600 receives a set of one or more inputs to move age slider 620b above or below the particular age range and, in response, a set of one or more settings 618a-618l are modified. In some embodiments, age slider 620b cannot be moved past a minimum age (e.g., 3 years old) or a maximum age (e.g., 14 years old).

Figures 6H, 6I:
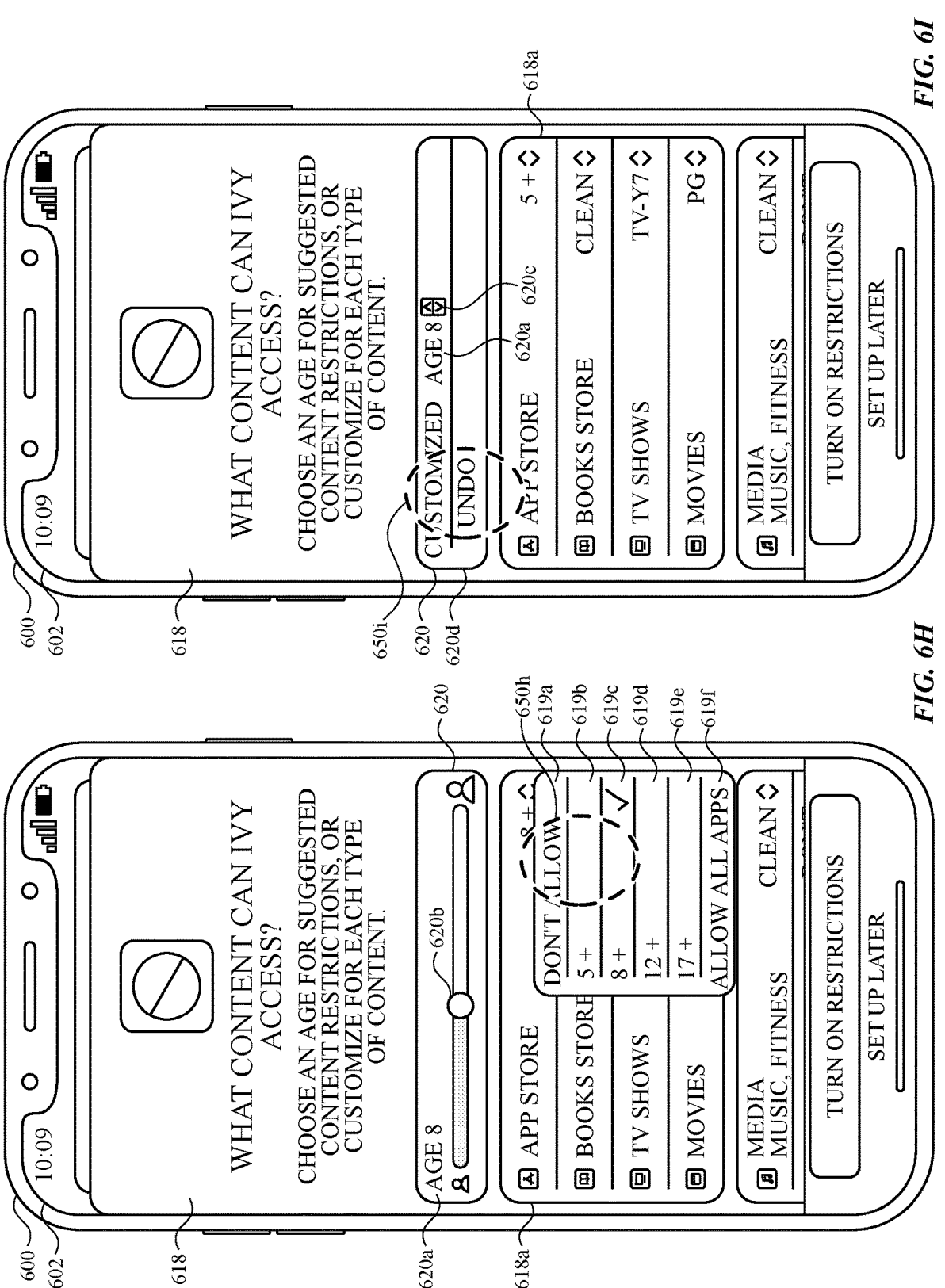

While settings 618a-618l are initially prepopulated with age-appropriate restricted settings as a predetermined set, settings 618a-618l are individually customizable. In FIG. 6G, device 600 detects input 650g (e.g., a tap input) corresponding to selection of setting 618a for "app store." In FIG. 6G, setting 618a for "app store" is currently set to "8+," after movement of age slider 620b from FIG. 6F to FIG. 6G. In response to receiving input 650g, device 600 displays a menu for modifying age restrictions overlaid on managed account settings user interface 618, as shown in FIG. 6H. In some embodiments, device 600 receives a set of one or more inputs (e.g., taps) corresponding to selection and modification of one or more settings 618a-618l.

In FIG. 6H, device 600 displays the menu for modifying age restrictions for setting 618a for "app store." The menu includes various selectable options 619a-619f for restricting content for "app store." Option 619c for "8+" is currently selected, as indicated by a check mark. In some embodiments, the managed account (e.g., child account) will be able to browse applications that are rated for users 8 years and older. In some embodiments, when selected, options 619b-619e limit app store access to show apps appropriate for users at or over the indicated age. In some embodiments, when selected, option 619a (e.g., "don't allow") restricts app store access entirely (e.g., the app store cannot be accessed) by the managed account (e.g., child account). In some embodiments, when selected, option 619f (e.g., "allow all apps") does not limit app store access (e.g., all apps are available for browsing) for the managed account (e.g., child account). In FIG. 6H, device 600 detects input 650h (e.g., a tap input) corresponding to selection of option 619b (e.g., "5+") and, in response, updates setting 618a from "8+" to "5+," as shown in FIG. 6I. In some embodiments, device 600 updates the menu for modifying age restrictions for setting 618a for "app store" by moving the check mark to option 619b before ceasing display of the menu.

Figures 6J, 6K:
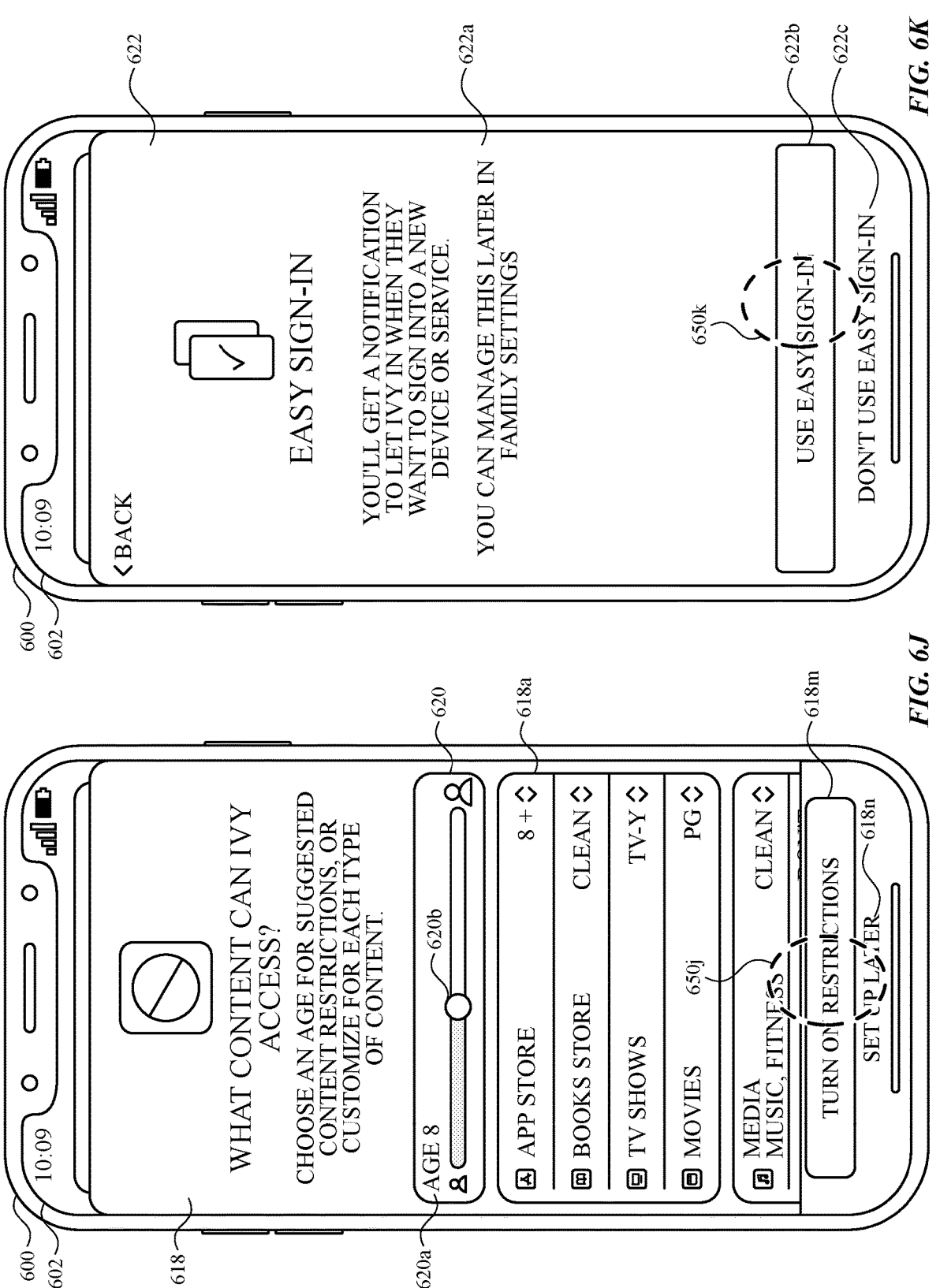

In FIG. 6I, in response to detecting input 650h, device 600 displays managed account settings user interface 618 on display 602 with setting 618a for "app store" at "5+." In FIG. 6I, device 600 also updates age region 620. Age region 620 no longer includes age slider 620b and now includes age indication 620a, which reads, "customized age 8," along with arrows 620c for age modification and undo affordance 620d. In some embodiments, device 600 detects a set of one or more inputs (e.g., tap inputs) corresponding to selection of arrows 620c and, in response, modifies the prepopulated age-appropriate restricted settings (e.g., 618b-618l) without modifying customized settings (e.g., 618a). In FIG. 6I, device 600 detects input 650i (e.g., a tap input) corresponding to selection of undo affordance 620d and, in response, reverts customized setting 618a to "8+" for "app store," as shown in FIG. 6J. In some embodiments, if more than one setting (e.g., 618a-618l) is customized, selection of undo affordance 620d reverts the most recently customized setting, and further selections of undo affordance 620d reverts previously customized settings (e.g., in order of recency). In some embodiments, selection of undo affordance 620d reverts all modifications (e.g., customized settings, and/or modified age slider 620b) back to the initially prepopulated age-appropriate restricted settings based on birthdate, as in FIG. 6F.

In FIG. 6J, device 600 redisplays managed account settings user interface 618 on display 602 with setting 618a for "app store" at "5+" with age region 620 including age slider 620b, analogous to the settings of FIG. 6G. In FIG. 6J, device 600 detects input 650j (e.g., a tap input) corresponding to selection of turn on affordance 618m and, in response, proceeds with the process for creating the managed account (e.g., child account, and/or user account associated with a child). In some embodiments, device 600 detects selection of later affordance 618n. In some embodiments, after detecting selection of later affordance 618n, device 600 proceeds with the process for creating the managed account with the prepopulated age-appropriate restricted settings. In some embodiments, after detecting selection of later affordance 618n, device 600 proceeds with the process for creating the managed account without restricted settings.

In FIG. 6K, as part of the process for creating the managed account (e.g., child account), device 600 displays easy sign in user interface 622 on display 602. Easy sign in user interface 622 includes informational text 622a, enable affordance 622b, and disable affordance 622c. Device 600 detects input 650k (e.g., a tap input) corresponding to selection of enable affordance 622b and, in response, initiates a process for enabling sign in for the tablet and/or the managed account (e.g., child account) via a request sent to device 600 and/or a device associated with the primary user account, which is discussed in greater detail with respect to FIGS. 6U-6W. In some embodiments, device 600 detects an input corresponding to selection of disable affordance 622c and, in response, forgoes enabling sign in from a remote device associated with the primary user account.

Figures 6L, 6M:
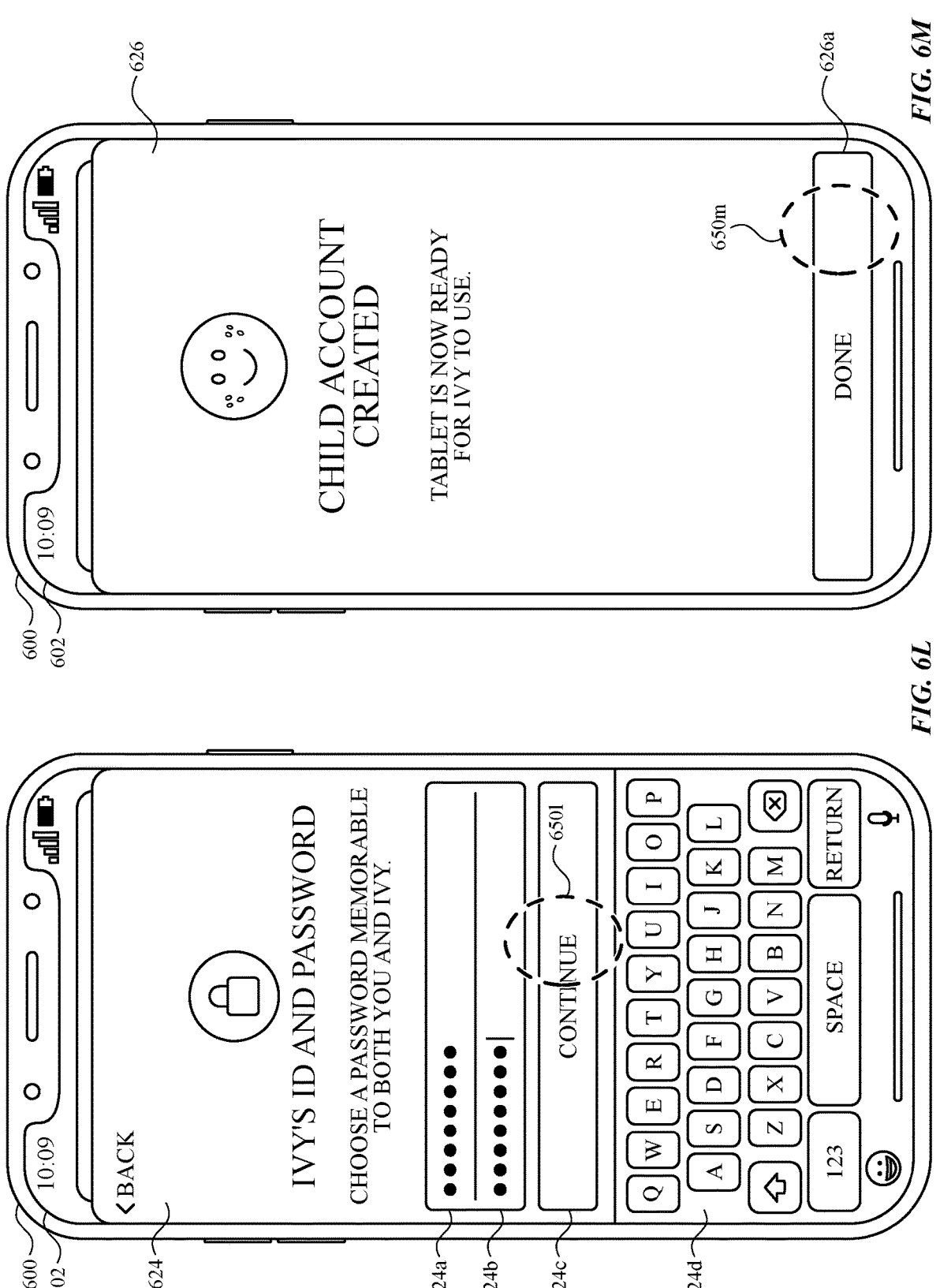

Turning now to FIG. 6L, device 600 displays password creation user interface 624 on display 602. Password creation user interface 624 includes password field 624a, verify password field 624b, continue affordance 624c, and keyboard 624d. In some embodiments, password field 624a and verify password field 624b are initially displayed as blank (e.g., unfilled, and/or empty), and device 600 receives a set of one or more inputs (e.g., taps) corresponding to selection of each field and entering a password using keyboard 624d. Once the passwords entered in password field 624a and verify password field 624b are the same, device 600 detects input 650l (e.g., a tap input) corresponding to selection of continue affordance 624c, and in response, device 600 completes the process for creating the managed account (e.g., child account), as shown by account created user interface 626 in FIG. 6M.

In FIG. 6M, device 600 displays account created user interface 626 on display 602 to indicate that the process for configuring the managed account (e.g., child account for Ivy) is now complete and that the tablet is ready for Ivy to use. In some embodiments, prior to displaying account created user interface 626, device 600 displays, on display 602, additional configuration user interfaces (e.g., screen time allowance settings, location settings, and/or payment settings) during the process for creating the managed account. In FIG. 6M, device 600 detects input 650m (e.g., a tap input) corresponding to selection of done affordance 626a. In response to receiving input 650m, device 600 ceases display of account created user interface 626 and displays family management user interface 628, as shown in FIG. 6N.

Figures 6N, 6O:
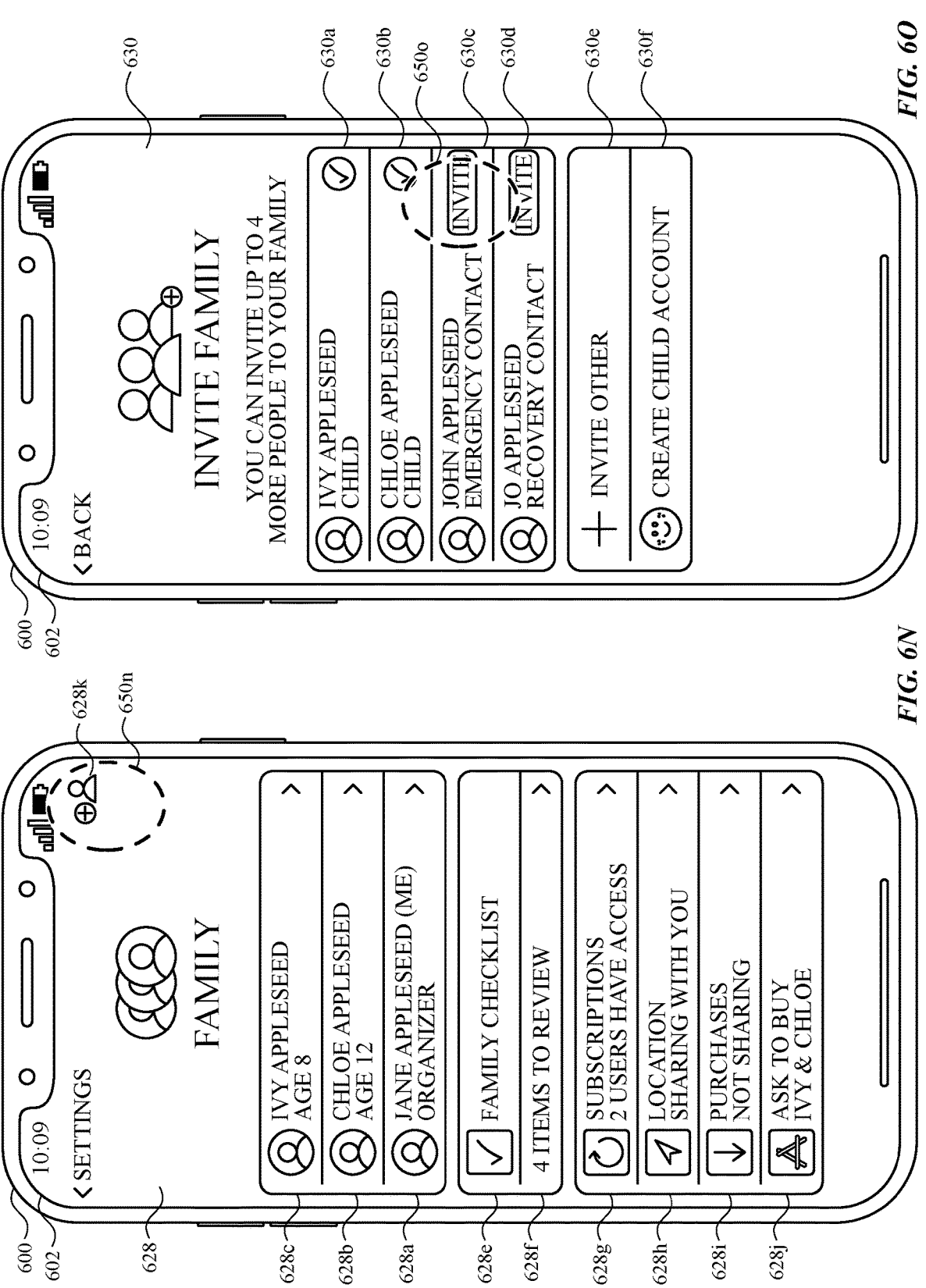

In FIG. 6N, device 600 displays family management user interface 628 on display 602. Family management user interface 628 is used to manage shared content (e.g., subscriptions, payment methods, and/or media) amongst user accounts added to a family account. Family management user interface 628 includes new member affordance 628k, owner account 628a for "Jane Appleseed," child account 628b for "Chloe Appleseed," and child account 628c for "Ivy Appleseed," which was configured during the process for creating the managed account as described with respect to FIGS. 6A-6M. Family management user interface 628 also includes family checklist 628e and review affordance 628f, which will be described in greater detail with respect to FIGS. 6R-6S. Family management user interface 628 further includes affordances 628g-628j that detail shared features amongst family account members and that, when selected, cause device 600 to display a user interface for modifying shared settings.

In FIG. 6N, device 600 detects input 650n (e.g., a tap input) corresponding to selection of new member affordance 628k and, in response, displays invitation user interface 630 on display 602, as shown in FIG. 6O. Invitation user interface 630 includes added member 630a for "Ivy" and added member 630b for "Chloe," each having a check mark to indicate that their user accounts have already been added to the family account. Invitation user interface 630 also includes suggestion 630c for "John Appleseed" and suggestion 630d for "Jo Appleseed," both of which are contacts identified as important (e.g., a designated contact for emergencies, and/or a designated contact for account recovery) to the primary user (e.g., Jane). Invitation user interface 630 further includes invite other affordance 630e that, when selected, initiates a process for selecting a contact to invite to the shared family account, and create child account affordance 630f that, when selected, initiates the process for creating a child account, similar to that described with respect to FIGS. 6C-6M. In FIG. 6O, device 600 detects input 650o (e.g., a tap input) corresponding to selection of invite affordance at suggestion 630c for "John Appleseed."

Figure 6P:
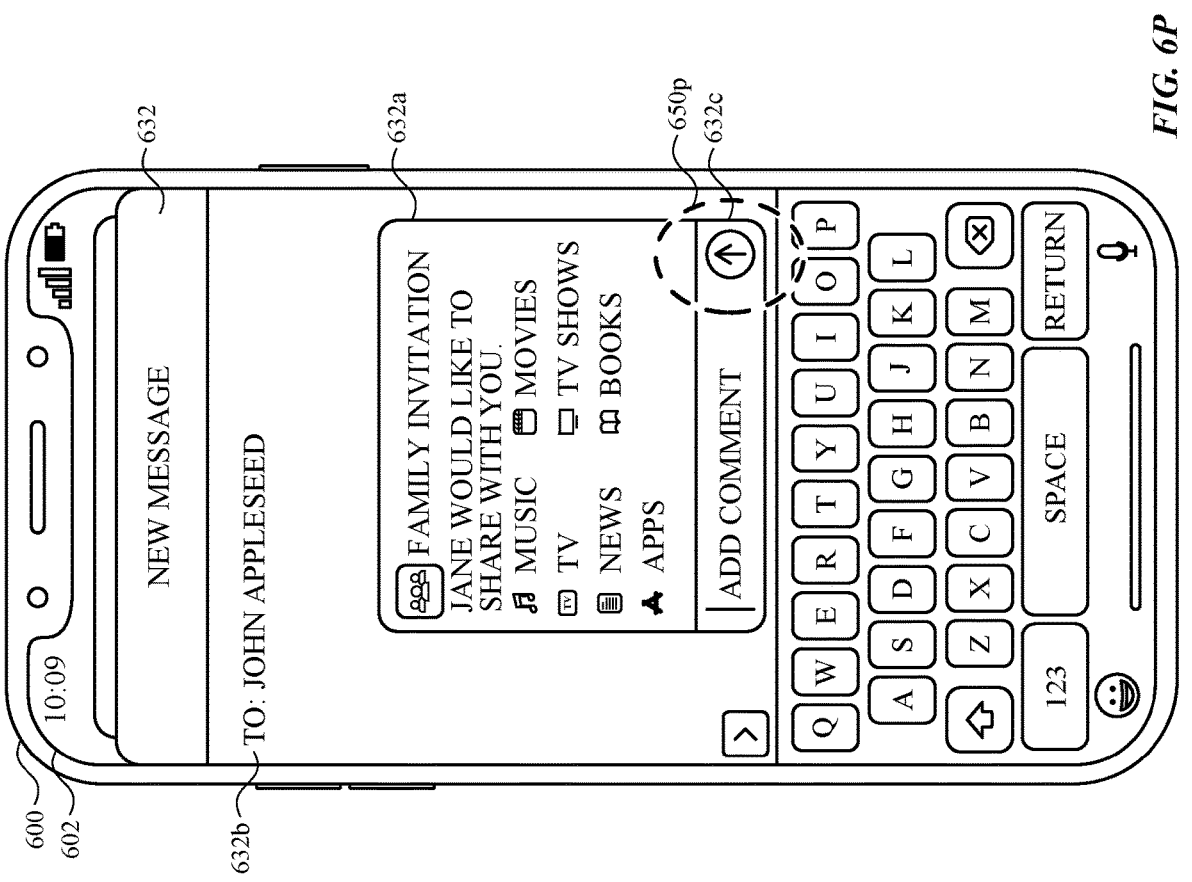

In FIG. 6P, in response to receiving input 650o, device 600 displays message user interface 632 that includes invitation 632a with contact field 632b populated for "John Appleseed." Invitation 632a details the content (e.g., subscriptions, media, cloud storage, payment methods) that will be shared with John Appleseed. In some embodiments, prior to displaying message user interface 632, device 600 displays a user interface for selecting content for sharing. In some embodiments, device 600 receives a set of one or more inputs to modify (e.g., include and/or exclude) the content (e.g., subscriptions, media, cloud storage, and/or payment methods) shared with John Appleseed. In some embodiments, the content (e.g., subscriptions, media, cloud storage, and/or payment methods) shared with John Appleseed is different from the content shared with another user account. Device 600 detects input 650p (e.g., a tap input) corresponding to selection of send affordance 632c, and in response, device 600 sends invitation 632a to John Appleseed, as shown in FIG. 6Q.

Figure 6Q:
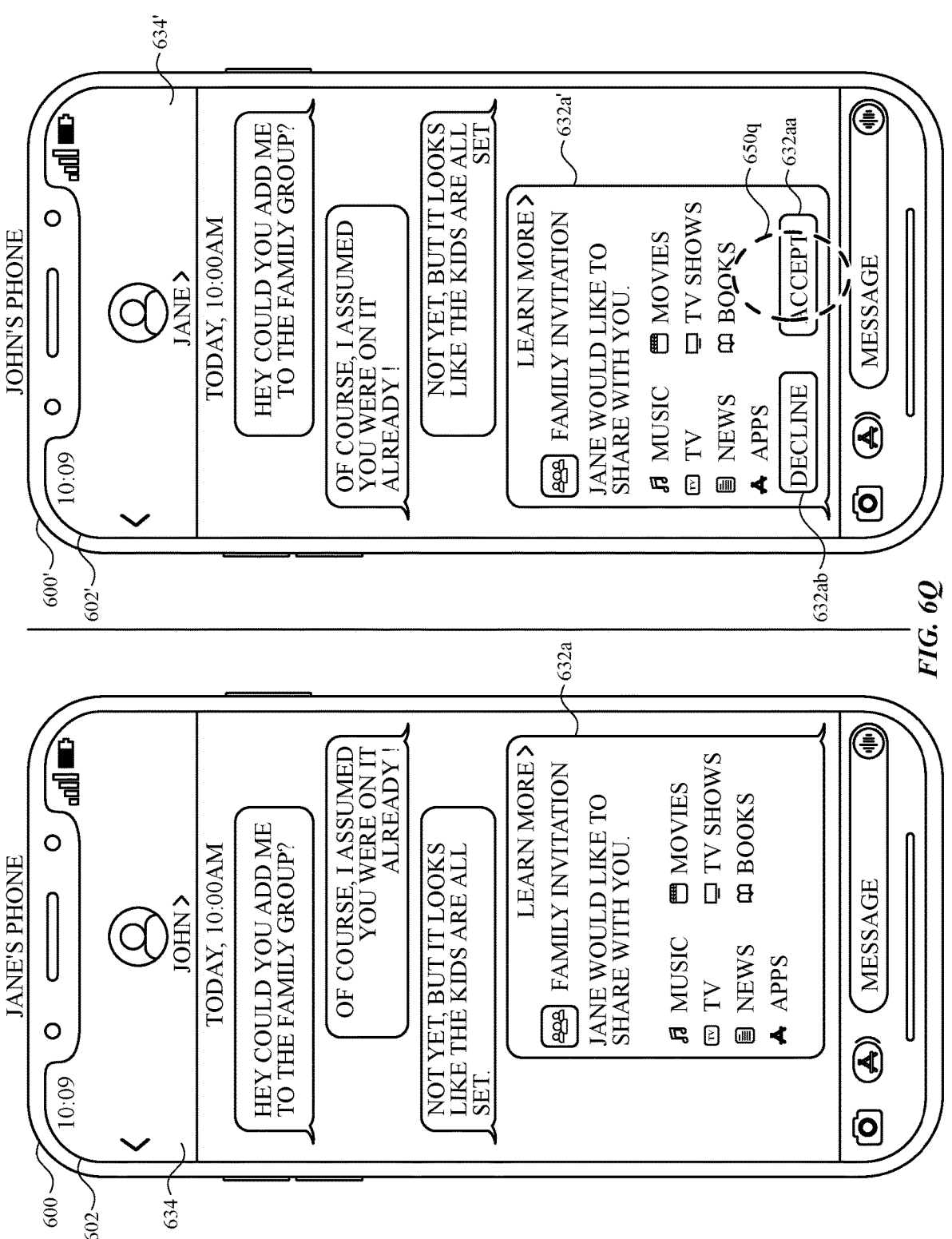

In FIG. 6Q, device 600 (e.g., "Jane's Phone") is illustrated on the left and displays message user interface 634 with "John" on display 602, while device 600' (e.g., "John's Phone," a smart phone) is illustrated on the right and displays message user interface 634' with "Jane" on display 602' (e.g., a touchscreen display). Message user interface 634 and message user interface 634' both include text messages exchanged between John and Jane. Message user interface 634 includes invitation 632a, as viewed on the sender device (e.g., device 600, "Jane's Phone"). Message user interface 634' includes invitation 632a', as viewed on the receiver device (e.g., device 600', "John's Phone") and additionally includes accept affordance 632aa and decline affordance 632ab. Device 600' detects input 650q (e.g., a tap input) corresponding to selection of accept affordance 632aa. In some embodiments, in response to receiving input 650q at accept affordance 632aa, invitation 632a and invitation 632a' are updated to show an accepted status. In some embodiments, device 600' detects an input corresponding to selection of decline affordance 632bb, and in response, invitation 632a and invitation 632a' are updated to show a declined status.

Figure 6R:
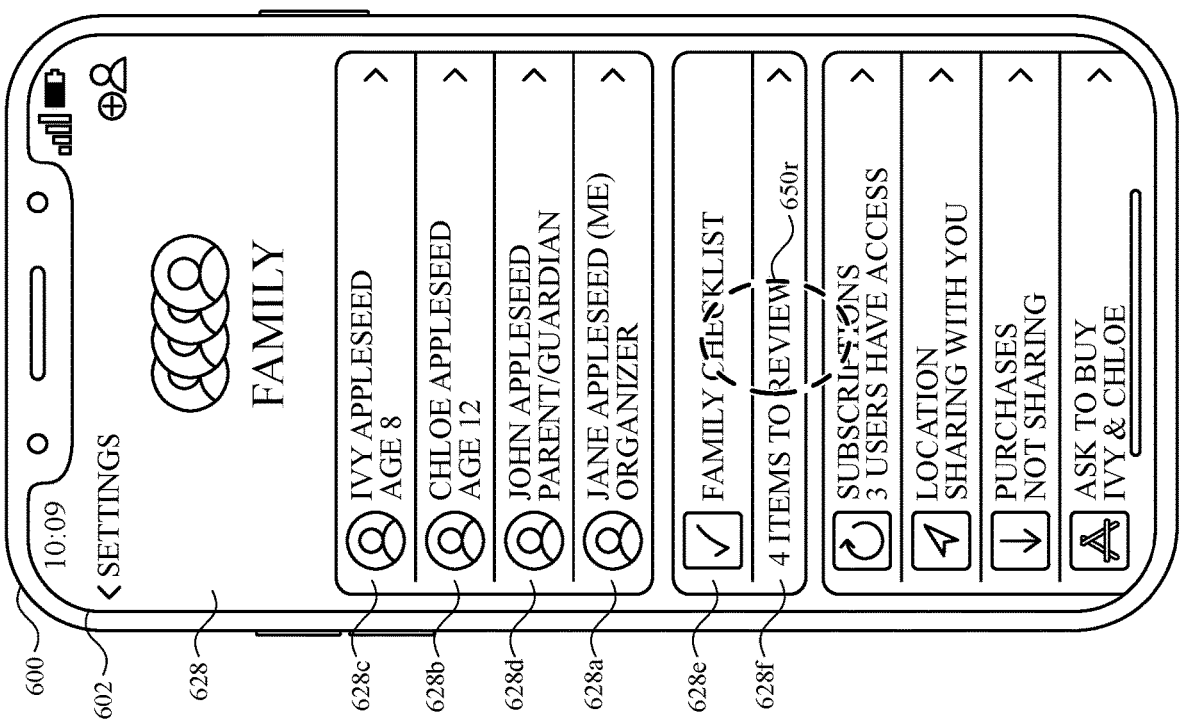

Turning to FIG. 6R, device 600 displays family management user interface 628, which now includes member account 628d for "John Appleseed," along with owner account 628a for "Jane Appleseed," child account 628b for "Chloe Appleseed," and child account 628c for "Ivy Appleseed." Device 600 detects input 650r (e.g., a tap input) corresponding to selection of review affordance 628f in family checklist 628e and, in response, displays family checklist user interface 636, as shown in FIG. 6S.

Figure 6T:
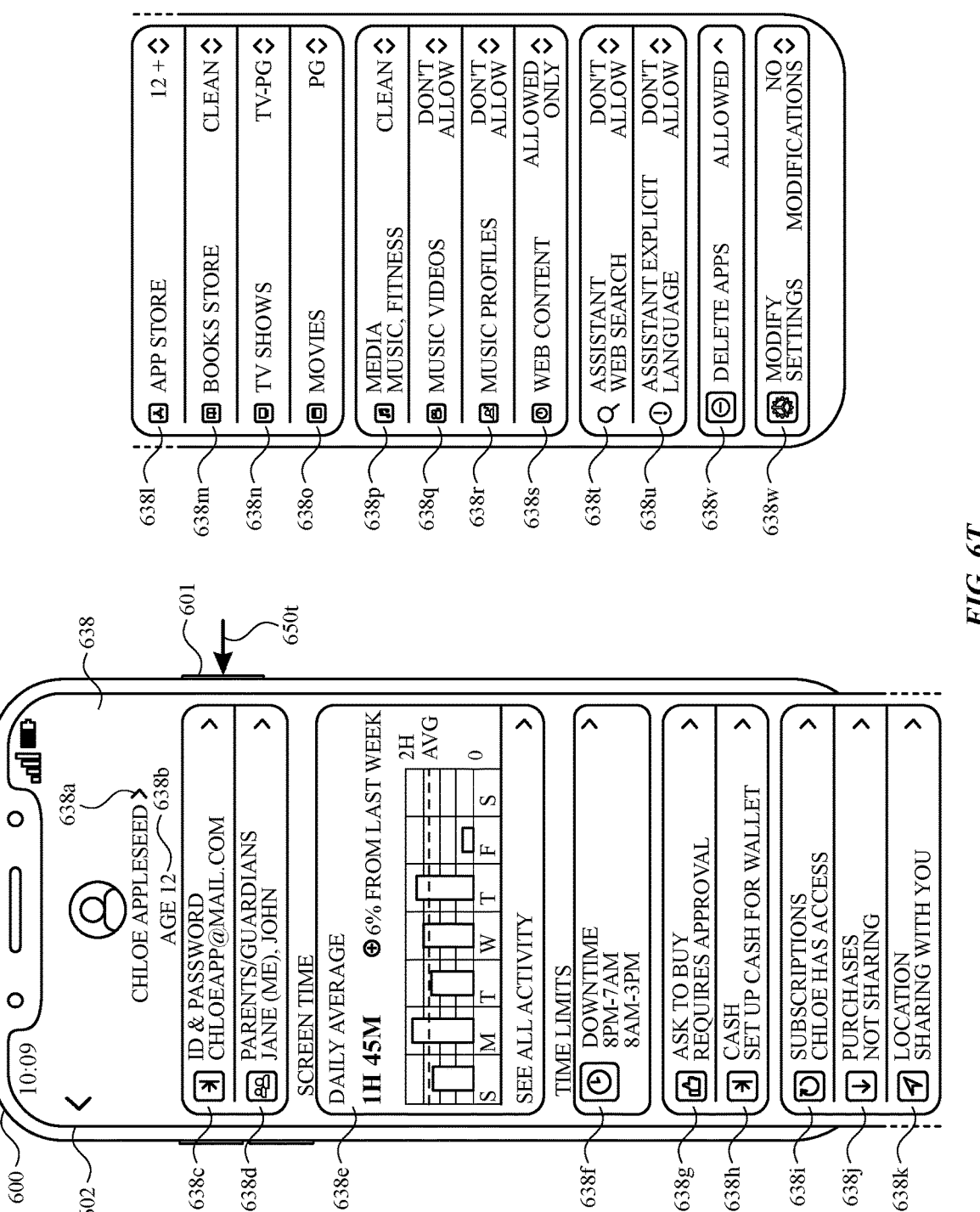

In FIG. 6S, device 600 displays family checklist user interface 636 on display 602. Family checklist user interface 636 includes affordances 636a-636f corresponding to various functions for managing the shared family account and managed accounts (e.g., child accounts). In some embodiments, affordances 636a-636f include text describing the corresponding function in detail. Affordances 636a-636f are organized by functions requiring review (e.g., affordances 636a-636d), which include exemplary text such as "update" and "set up," and functions recently reviewed (e.g., affordance 636e, and/or affordance 636f), which include exemplary text such as "updated yesterday" and "reviewed yesterday." Device 600 detects input 650s (e.g., a tap input) corresponding to selection of affordance 636a for "update Chloe's settings" and, in response, displays account settings user interface 638, as shown in FIG. 6T. In some embodiments, device 600 detects a set of one or more inputs corresponding to selection of any of affordances 636b-636f and, in response, displays a settings user interface for modifying the settings of the function associated with the selected affordance.

In FIG. 6T, device 600 displays account settings user interface 638 on display 602. In some embodiments, device 600 displays account settings user interface 638 after detecting a set of one or more inputs corresponding to selection of child account 628b for "Chloe Appleseed" on family management user interface 628 of FIG. 6R. In some embodiments, device 600 displays an account settings user interface (e.g., similar to account settings user interface 638) corresponding to the user account selected (e.g., member account 628d for "John Appleseed," owner account 628a for "Jane Appleseed," child account 628b for "Chloe Appleseed," and/or child account 628c for "Ivy Appleseed") from family management user interface 628 of FIG. 6R.

Account settings user interface 638 includes contact affordance 638a for "Chloe Appleseed" that, when selected, causes device 600 to display a contact user interface similar to contact user interface 646 of FIG. 6AA. Account settings user interface 638 includes age indication 638b showing that Chloe is "age 12." Account settings user interface 638 includes ID settings affordance 638c that, when selected, causes device 600 to display a user ID and password management user interface. Account settings user interface 638 includes parents/guardians affordance 638d indicating that "Jane (me), John" are parents and/or guardians of Chloe and can therefore approve requests sent by Chloe's user account, similar to requests 642a-642c of FIG. 6W. Account settings user interface 638 includes screen time graph 638e that, when selected, causes device 600 to display a screen time user interface containing additional information related to Chloe's device usage, as well as downtime affordance 638f that includes time periods for when one or more devices associated with Chloe's managed user account are in a restricted mode (e.g., school time mode, and/or downtime mode) and that, when selected, causes device 600 to display a screen time configuration user interface for managing Chloe's device usage. Account settings user interface 638 further includes settings affordances 638g-638w, which can be individually selected to cause device 600 to display a user interface for managing the selected setting. In particular, settings affordances 638l-638w are analogous to settings 618a-618l, which are prepopulated based on birthdate, as described in detail with respect to FIGS. 6F-6J. In some embodiments, device 600 detects a set of one or more inputs corresponding to one or more settings affordances 638g-638w and, in response to detecting the set of one or more inputs, modifies the one or more settings for Chloe's managed account. In FIG. 6T, device 600 detects input 650t (e.g., a press input) corresponding to hardware button 601, and in response, device 600 transitions into a locked state (e.g., low power mode (e.g., with display off and/or with a dimmed display)).

Figures 6U, 6V:
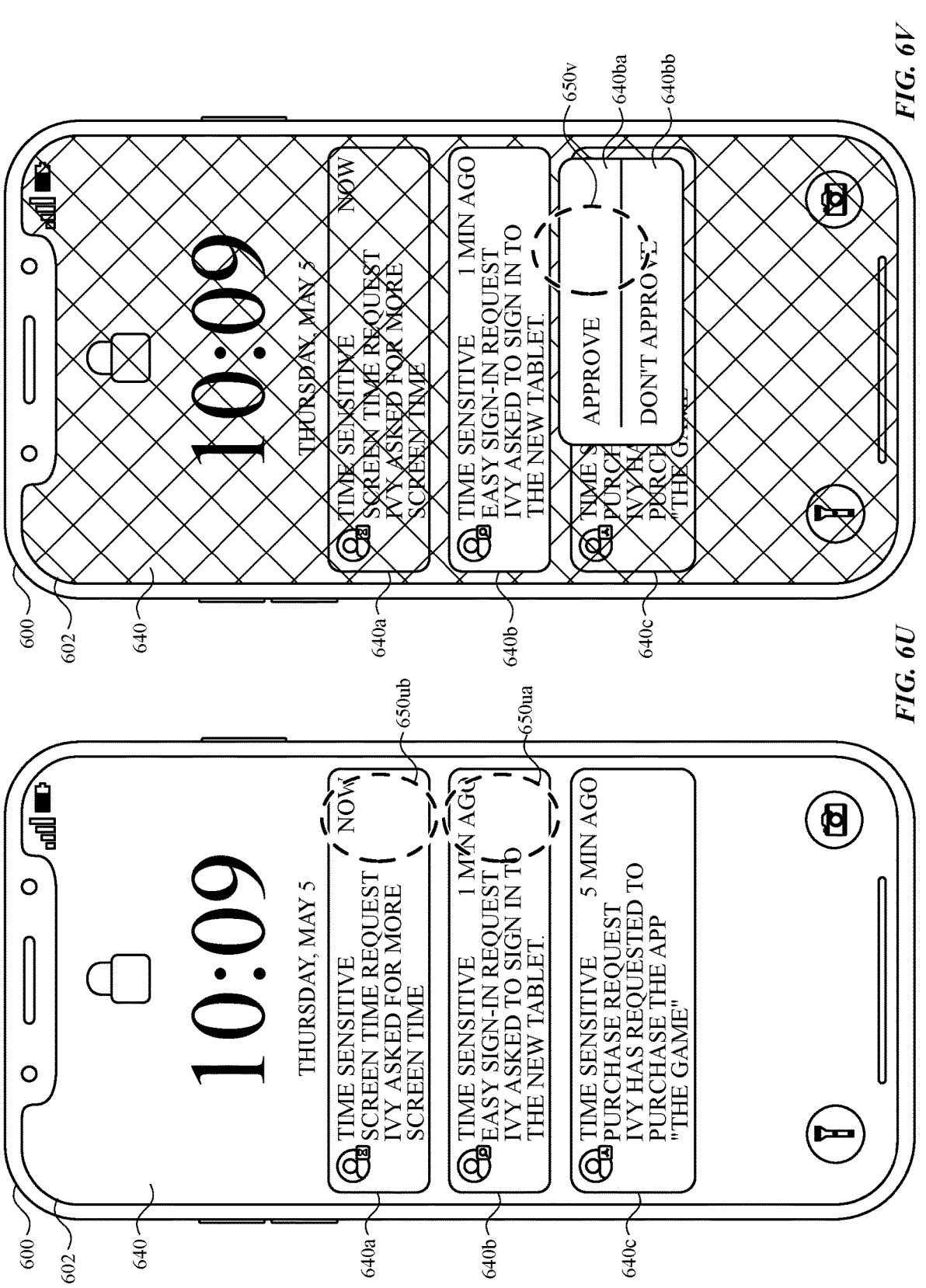

In FIG. 6U, device 600, on display 602, displays lock screen user interface 640 that includes screen time request notification 640a, sign in request notification 640b, and purchase request notification 640c, all three of which are sent from Ivy's device (e.g., the tablet discussed with respect to FIG. 6A). Device 600 detects input 650ua (e.g., a long-press input) corresponding to selection of sign in request notification 640b.

In FIG. 6V, in response to detecting input 650ua, device 600 displays, on display 602, sign in request notification 640b in a visually emphasized state (e.g., without a blurring treatment) with lock screen user interface 640, screen time request notification 640a, and purchase request notification 640c in a visually deemphasized (e.g., via a blurring treatment) state. In some embodiments, sign in request notification 640b includes location information relating to the device (e.g., the tablet) requesting sign in approval. As discussed with respect to FIG. 6K, sign in for the tablet and/or the managed account (e.g., child account) via a request sent to device 600 and/or a device associated with the primary user account has been enabled for Ivy's managed user account. Device 600 also displays approve affordance 640ba and don't approve affordance 640bb, which are responses for sign in request notification 640b from Ivy's tablet. Device 600 detects input 650v (e.g., a tap input) corresponding to selection of approve affordance 640ba, which causes successful sign in for Ivy's tablet. In some embodiments, device 600 detects an input corresponding to selection of don't approve affordance 640bb, in which Ivy's tablet is not successfully signed in to the managed user account (e.g., child account).

Figures 6W, 6X:
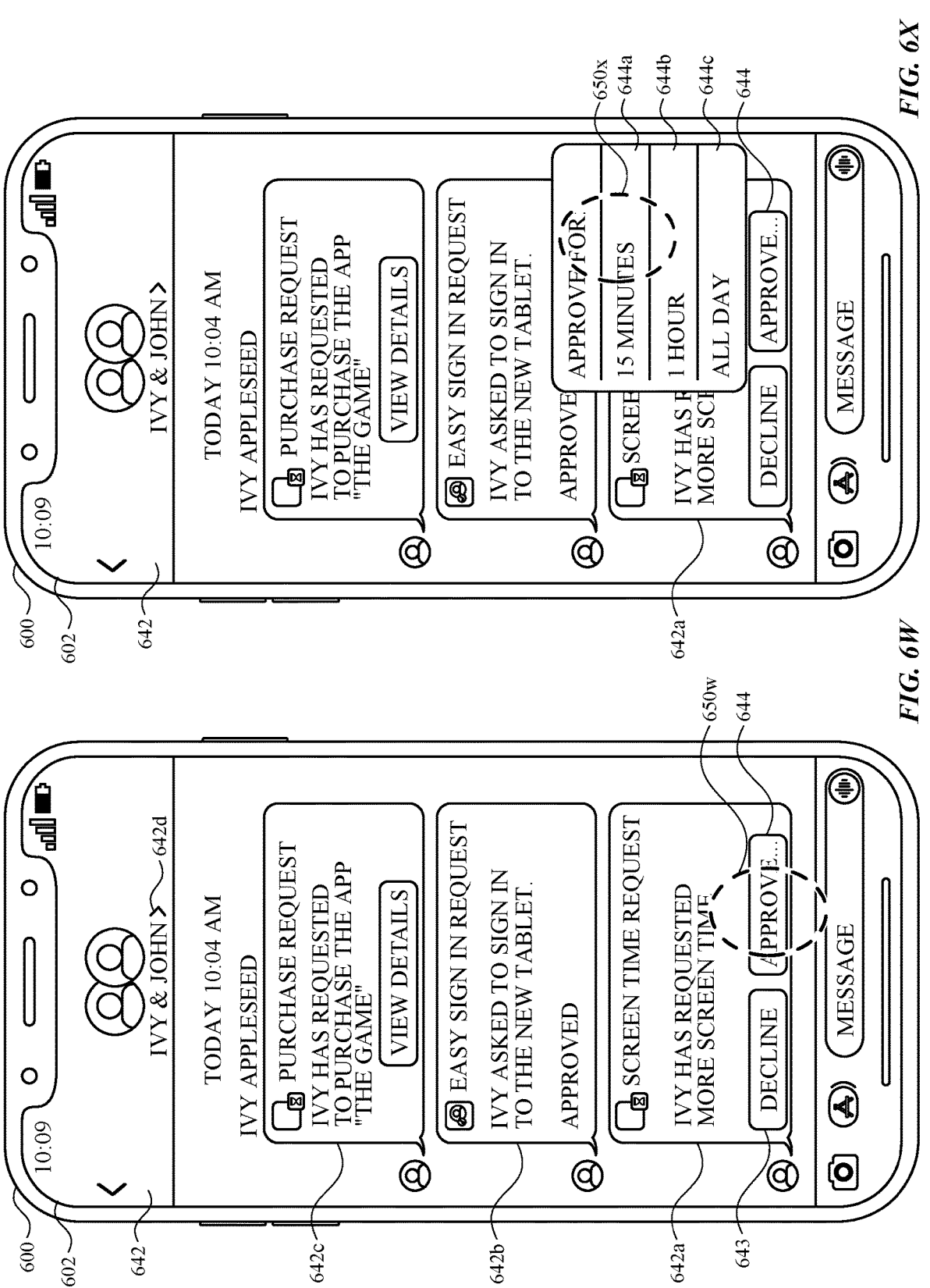

Turning back to FIG. 6U, device 600 also detects input 650ub (e.g., a tap input) corresponding to selection of screen time request notification 640a and, in response, displays group message user interface 642, as shown in FIG. 6W. Group message user interface 642 includes screen time request 642a, sign in request 642b, purchase request 642c. Sign in request 642b indicates "approved," since device 600 received input 650v corresponding to selection of approve affordance 640ba in FIG. 6V. Purchase request 642c includes a view details affordance that, when selected, causes device 600 to display an application details user interface for "The Game." Group message user interface 642 also includes group member indication 642d, which reads "Ivy & John." In some embodiments, when requests, such as screen time request 642a, sign in request 642b, purchase request 642c, are enabled for the managed user account (e.g., child account), the requests are sent to one or more parents and/or guardians (e.g., Jane, John, and/or additional adults within the shared family account) of the user (e.g., Ivy) associated with the managed user account (e.g., child account). In some embodiments, another parent or guardian (e.g., John) can approve or deny one or more requests (e.g., screen time request 642a, sign in request 642b, and/or purchase request 642c) and the request on group message user interface 642 will update to indicate another parent or guardian approved or denied the request.

In FIG. 6W, screen time request 642a includes approve affordance 644 and decline affordance 643. Device 600 detects input 650w corresponding to selection of approve affordance 644 and, in response, displays an approval menu overlaid on screen time request 642a, as shown in FIG. 6X. In FIG. 6X, the approval menu includes 15 minutes affordance 644a, 1 hour affordance 644b, and all day affordance 644c, each of which provide a designated amount of time for the managed user account (e.g., Ivy's child account) to use the device (e.g., Ivy's tablet) associated with the managed user account. Device 600 detects input 650x (e.g., a tap input) corresponding to selection of 15 minutes affordance 644a.

Figures 6Y, 6Z:
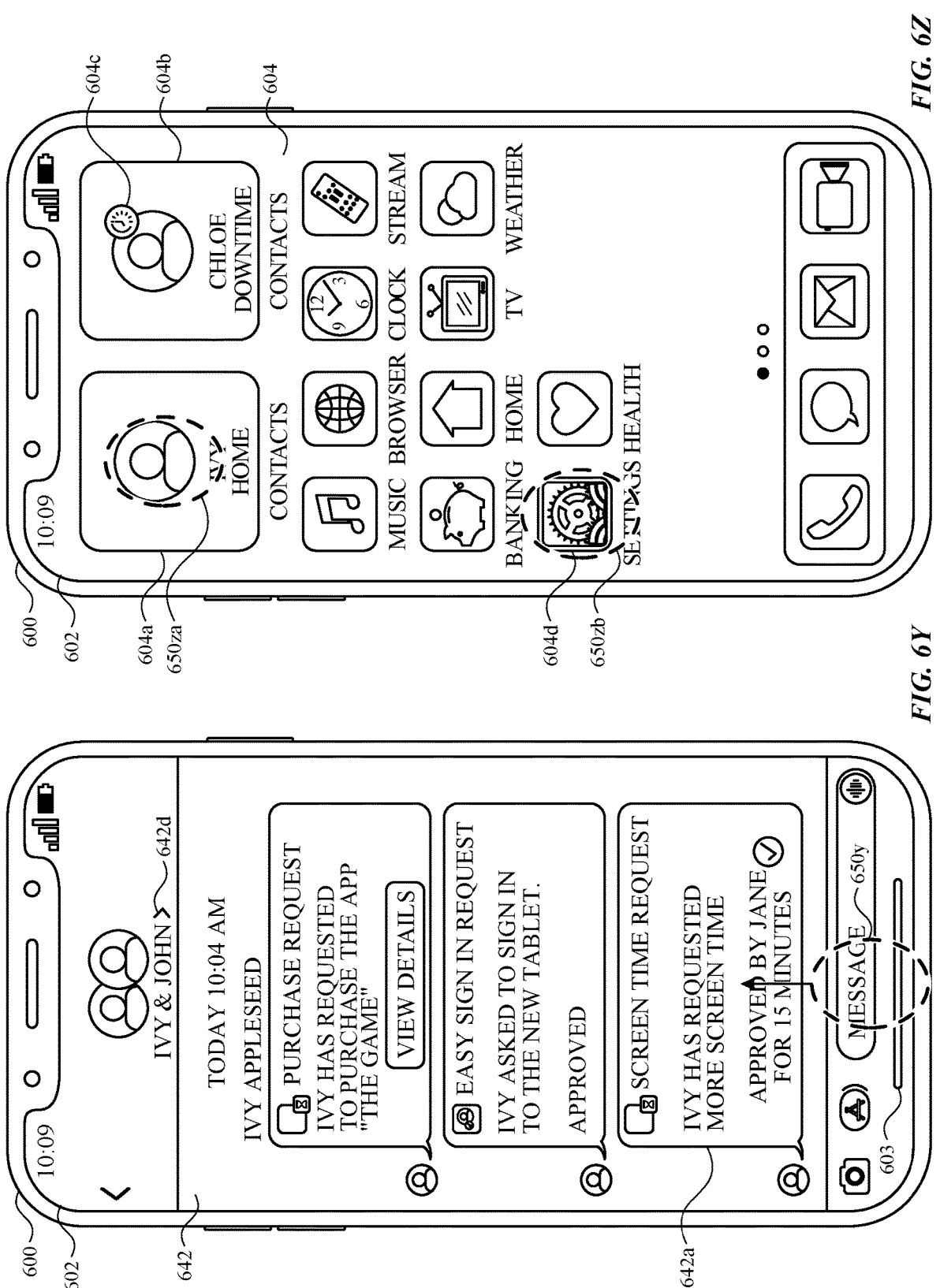
Figure 6A:
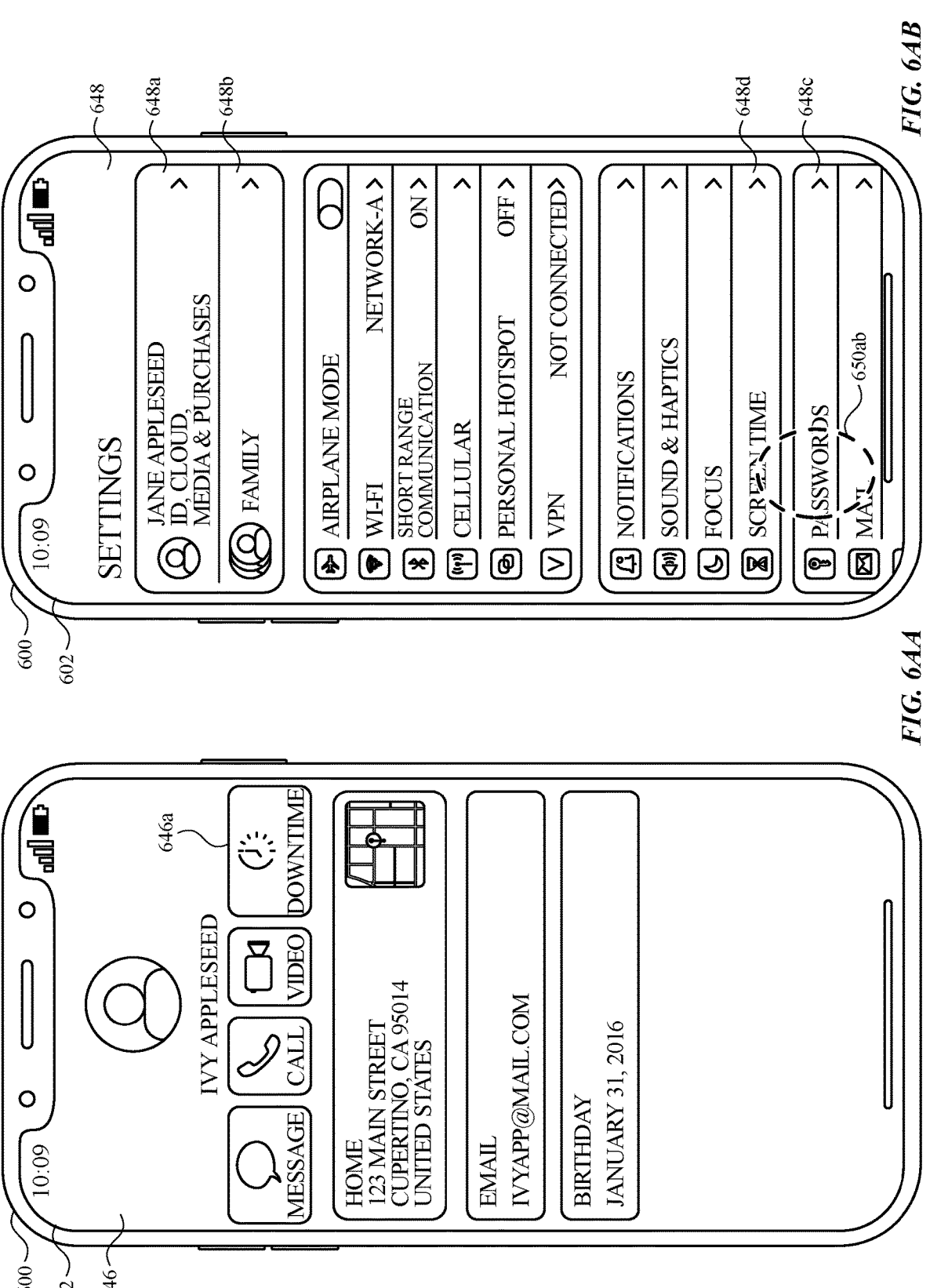
Figure 6A:
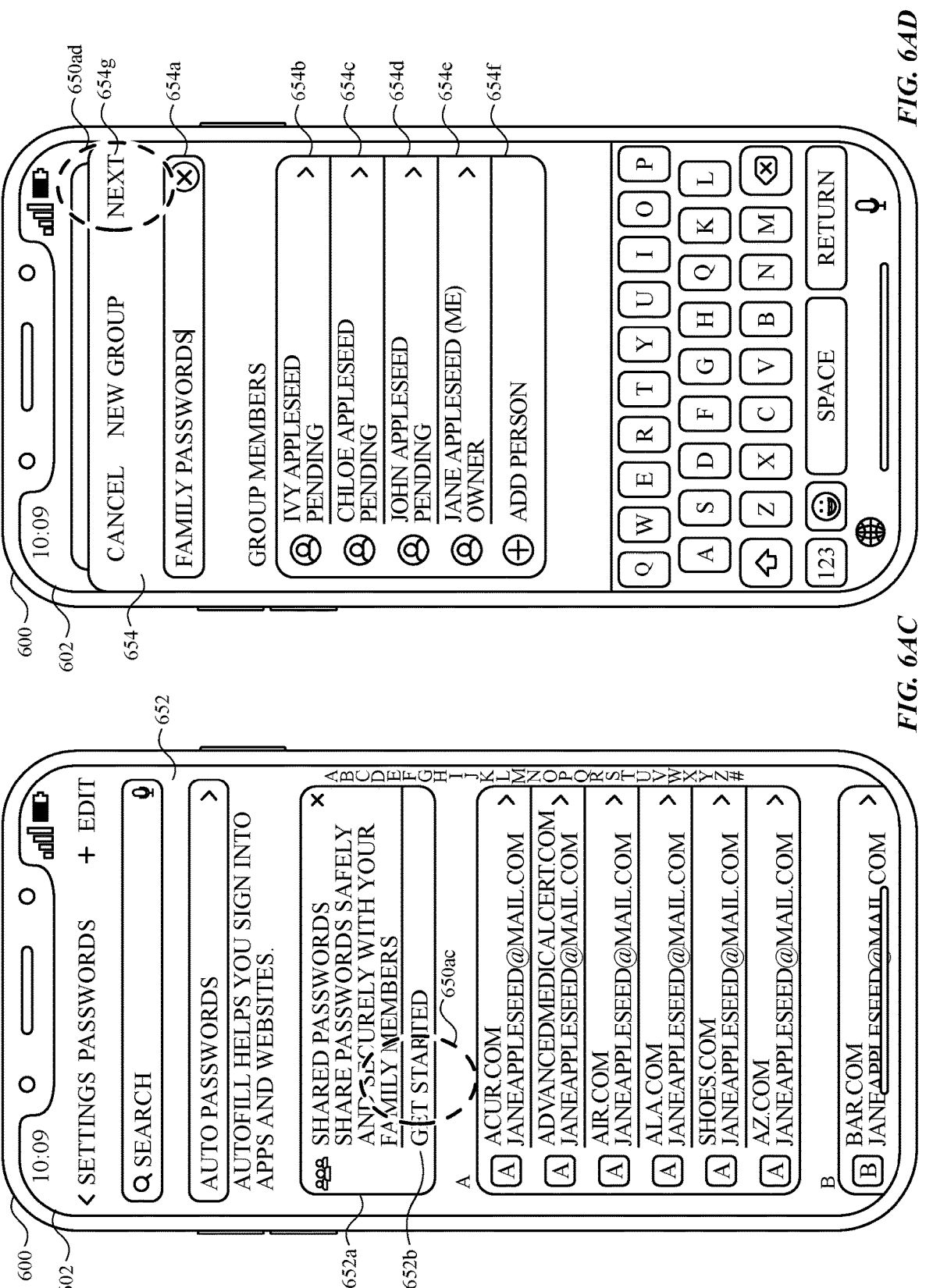
Figure 6A:
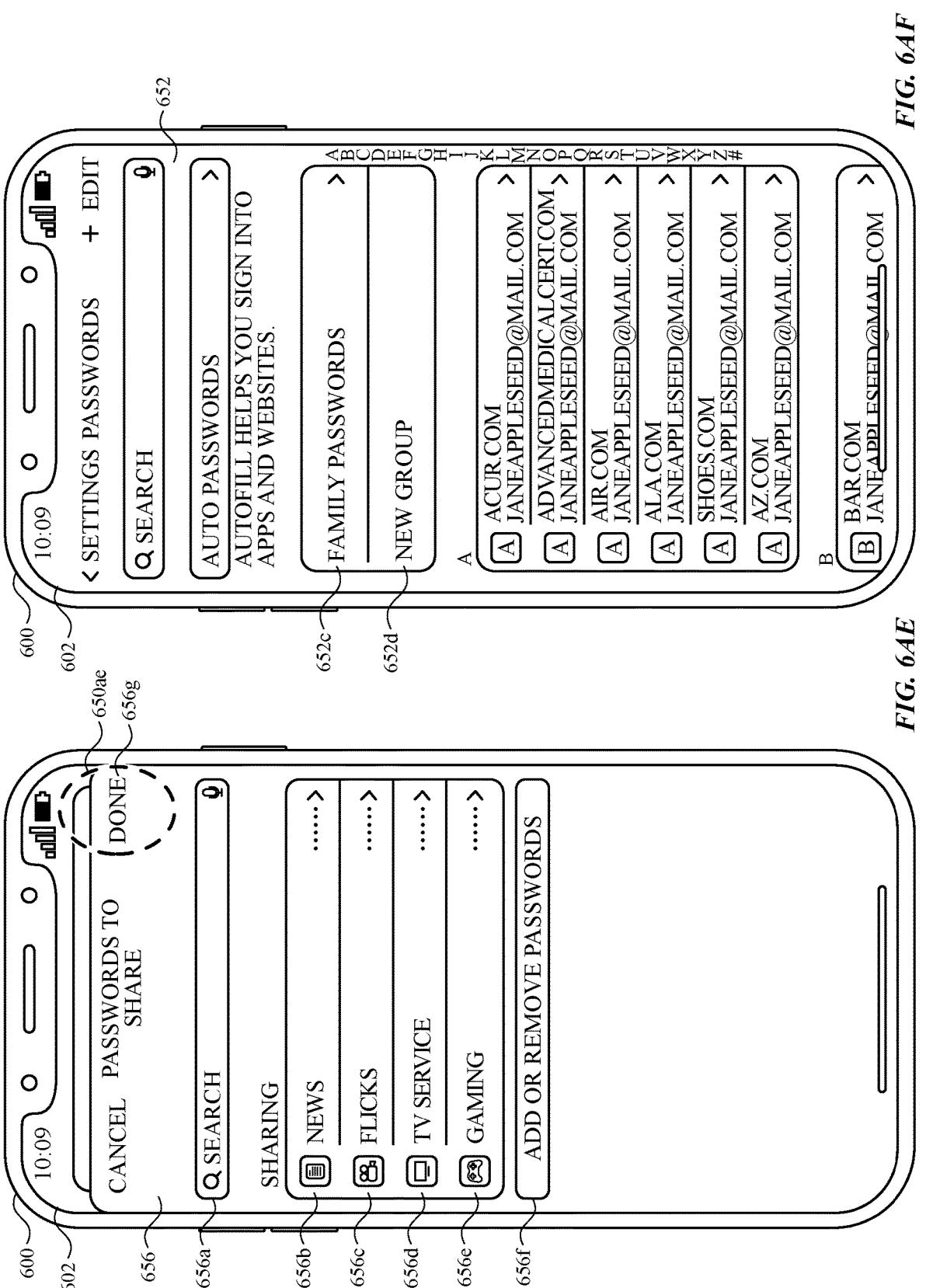

In FIG. 6Y, in response to detecting input 650x, device 600 updates screen time request 642a by replacing approve affordance 644 and decline affordance 643 with approval text (e.g., "approved by Jane for 15 minutes") on group message user interface 642. In some embodiments, Ivy's tablet becomes available for use for 15 minutes before becoming locked due to screen time restrictions. Device 600 detects input 650y (e.g., a swipe up input) at home affordance 603, and in response, device 600 ceases display of group message user interface 642 and displays home screen user interface 604, as shown in FIG. 6Z.

In FIG. 6Z, device 600 displays home screen user interface 604 on display 602. Home screen user interface 604 includes contact affordance 604a for "Ivy" and contact affordance 604b for "Chloe." Contact affordance 604b for "Chloe" includes indication 604c along with text, "downtime," to indicate that the one or more devices associated with Chloe's managed user account (e.g., child account) are in a restricted mode (e.g., downtime mode), per the time periods listed in downtime affordance 638f of FIG. 6T. In some embodiments, additional indications, similar to indication 604c, reflecting the current mode (e.g., do not disturb mode, and/or schooltime mode) of the one or more devices associated with Chloe's managed user account are included in contact affordance 604b. Device 600 detects input 650za (e.g., a tap input) corresponding to selection of contact affordance 604a for "Ivy" and, in response, displays contact user interface 646 on display 602, as shown in FIG. 6AA.

In FIG. 6AA, contact user interface 646 for "Ivy Appleseed" with various selectable affordances for contacting Ivy, contact information (e.g., phone number, address, email, and/or birthday), and downtime affordance 646a. In some embodiments, device 600 detects an input (e.g., a tap input) corresponding to selection of downtime affordance 646a and, in response, initiates a process for modifying the mode of the one or more devices (e.g., tablet, smart phone, and/or smart watch) associated with Ivy's managed account (e.g., child account).

Turning back to FIG. 6Z, home screen user interface 604 additionally includes app icons, including settings icon 604d. Device 600 detects input 650zb (e.g., a tap input) corresponding to selection of settings icon 604d and, in response, displays settings user interface 648, in FIG. 6AB.

In FIG. 6AB, settings user interface 648 includes owner account affordance 648a, family account affordance 648b, password affordance 648c, and additional settings affordances. In some embodiments, device 600 detects an input corresponding to selection of owner account affordance 648a and, in response, displays a personal account management user interface on display 602. In some embodiments, device 600 detects an input corresponding to selection of family account affordance 648b and, in response, displays family management user interface 628, as shown in FIG. 6R. In FIG. 6AB, device 600 detects input 650ab corresponding to selection of password affordance 648c and, in response, displays password user interface 652 on display 602, as shown in FIG. 6AC.

In FIG. 6AC, device 600 displays password user interface 652 that includes saved account information (e.g., user names and passwords) for the primary user account of device 600 (e.g., Jane's account) as well as shared passwords informational banner 652a and enable affordance 652b. Device 600 detects input 650ac (e.g., a tap input) corresponding to selection of enable affordance 652b and, in response, displays new password group user interface 654, as shown in FIG. 6AD.

In FIG. 6AD, device 600 displays new password group user interface 654 on display 602. New password group user interface 654 includes group name field 654a which reads, "Family Passwords," group members 654b-654e prepopulated with family members (e.g., 628a-628d of FIG. 6R), and add person affordance 654f In some embodiments, group name field 654a is initially displayed without "Family Passwords," and device 600 receives a set of one or more inputs to enter a group name. In some embodiments, group members 654b-654e are not initially displayed, and device 600 receives a set of one or more inputs at add person affordance 654f to add group members 654b-654e to the "Family Passwords" group. In some embodiments, device 600 detects a set of one or more inputs corresponding to one or more group members 654b-654e to remove the selected group member from the "Family Passwords" group. In some embodiments, device 600 detects a set of one or more inputs corresponding to selection of add person affordance 654f to add additional contacts (e.g., contacts who are not part of the family account) to the "Family Passwords" group. In FIG. 6AD, device 600 detects input 650ad (e.g., a tap input) and, in response, displays password selection user interface 656 on display 602, as shown in FIG. 6AE.

In FIG. 6AE, device 600 displays, on display 602, password selection user interface 656 that includes search bar 656a, shared passwords 656b-656e, edit affordance 656f, and done affordance 656g. In some embodiments, device 600 prepopulates password selection user interface 656 with shared passwords 656b-656e based on settings accessible via family management user interface 628 in FIG. 6R. In some embodiments, prior to displaying shared passwords 656b-656e, device 600 receives a set of one or more inputs starting with selection of edit affordance 656f and initiates a process for selecting passwords for sharing. In some embodiments, device 600 detects an input corresponding to selection of edit affordance 656f and, in response, displays a password listing with options to add or remove saved passwords from the group of shared passwords. In some embodiments, device 600 detects an input corresponding to search bar 656a and, in response, displays a saved password search user interface. In FIG. 6AE, device 600 detects input 650ae (e.g., a tap input) corresponding to selection of done affordance 656g.

In FIG. 6AF, in response to detecting input 650ae, device 600 redisplays password user interface 652 that now includes family password group affordance 652c and new group affordance 652d. In some embodiments, device 600 receives an input corresponding to selection of family password group affordance 652c and, in response, displays a password group editing user interface for managing group members and shared passwords. In some embodiments, device 600 receives an input corresponding to selection of new group affordance 652d and, in response, initiates a process for creating a new shared password group, similar to the process described with respect to FIG. 6AD-6AE. In some embodiments, if the user (e.g., user account) of device 600 is a member of other shared password groups, device 600 displays additional affordances corresponding to the other shared password groups, similar to family password group affordance 652c.

FIG. 7 is a flow diagram illustrating a method for managing user accounts using a computer system in accordance with some embodiments. Method 700 is performed at a computer system (e.g., 100, 300, 500, 600) (e.g., a wearable device, a smart watch, a smart phone, a tablet, a head-mounted device (HMD), and/or a computer system controlling an external display) that is in communication with a display generation component (e.g., 602) (e.g., a display controller, a touch-sensitive display system; and/or a display (e.g., integrated and/or connected)) and one or more input devices (e.g., a touch-sensitive surface, a mouse, a keyboard). Some operations in method 700 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for managing user accounts. The method reduces the cognitive burden on a user for managing user accounts, thereby creating a more efficient human-machine interface. For battery-operated computing devices, enabling a user to manage user accounts faster and more efficiently conserves power and increases the time between battery charges.

While a first user account (e.g., a user ID) (e.g., "Jane" of FIG. 6B; 628a) is active on (e.g., logged into) the computer system, the computer system (e.g., 600) detects (702), via the one or more input devices (e.g., 602), a first set of one or more inputs (e.g., 650a, 650b) corresponding to a request to initiate a process to create a second user account (e.g., 610e) (e.g., an account for a family member (e.g., a child)).

In response to the first set of one or more inputs, the computer system (e.g., 600) initiates (704) the process to create the second user account (e.g., the process described with respect to FIGS. 6C-6M).

During the process to create the second user account (706): the computer system (e.g., 600) displays (708), via the display generation component (e.g., 602), an access-setting user interface (e.g., 618) that includes a plurality of selectable options (e.g., 620, 618a-618l) for setting content (e.g., web-content; multimedia content (e.g., music, movies, television; application content)) access criteria (e.g., rules and/or restrictions). In some embodiments, the plurality of selectable age options are presented as a slider control with multiple positions that each correspond to a respective age.

In some embodiments, the access-setting user interface (e.g., 618) includes a first selectable (e.g., an age of 6 years old) option (710) (e.g., 620b at FIG. 6F; 618a at FIG. 6G; 618b-618l) (e.g., a position on a slider control; discrete, selectable affordance) of the plurality of selectable options that corresponds to a first set of content access criteria (e.g., a set of criteria that manages what content a user of the second account can access (e.g., while logged into the computer system or another computer system)).

In some embodiments, the access-setting user interface (e.g., 618) includes a second selectable (e.g., an age of 8 years old) option (712) (e.g., 620b at FIG. 6G; 618a at FIG. 6I; 618b-618l) of the plurality of selectable age options that corresponds to a second set of content access criteria, different from the first set of content access criteria.

In some embodiments, the access-setting user interface (e.g., 618) includes a first indication (714) (e.g., 618a) (e.g., graphical indication, a textual indication) of a currently selected content access level (e.g., 618a-618l) (e.g., permission level; permission type (e.g., PG or lower access level for movies; TV-Y7 or lower for television content)) for a first type of content.

During the process to create the second user account (706): while the first selectable option is selected (e.g., the slider is set to 6 years old (e.g. 620a and 620b of FIG. 6F)) and while the first indication indicates that the first type of content has a first access level (e.g., TV-Y, 618c) that is based on the first set of content access criteria, the computer system (e.g., 600) detects (716), via the one or more input devices (e.g., 602), a second set of one or more inputs (e.g., 650f) (e.g., a finger swipe corresponding to movement of the thumb of a slider control to a position corresponding to 8 years old) that includes a first input corresponding to selection of the second selectable option (in some embodiments, and corresponding to de-selection of the first selectable age option).

During the process to create the second user account (706) and in response to the second set of one or more inputs (718): the computer system (e.g., 600) selects (720) the second selectable option; and the computer system (e.g., 600) modifies (722) the first indication to indicate a second access level (e.g., "8+" of 618a in FIG. 6G), different from the first access level (e.g., "5+" of 618a in FIG. 6F), for the first type of content (e.g., updating the access level for a TV content type from TV-Y to TV-Y7 (e.g., 618c)), wherein the second access level is based on the second set of content access criteria. In some embodiments, the first type of content is selected from the group consisting of purchase content/purchase permissions, media content, web access, explicit language, explicit content, screen time, app usage limits, downloading apps, deleting apps, contacts and communication, and a combination thereof. Modifying an access level for content based on selection of an option from among a plurality of selectable options that correspond to prede-termined access criteria allows a user to adjust content access levels during an account creation process, without requiring a complicated set of controls, which provides the user with additional control options without cluttering the UI with additional displayed controls.

In some embodiments, the plurality of selectable options for setting content access criteria are a plurality of selectable age options (e.g., 620) (e.g., each option corresponds to an age (e.g., a 6 year old option, an 8 year old option)) for setting content access criteria. Providing a plurality of selectable age options provides the user with improved visual feedback as to the nature of the relevant access criteria.

In some embodiments, during the process to create the second user account and prior to displaying the access-setting user interface, the computer system (e.g., 600) receives data (e.g., via inputs provided at the computer system; from an external computer system) corresponding to a birthdate (e.g., 612c) and/or age for a user (e.g., 612a) associated with the second user account. In some embodi-ments, the first selectable option is a first selectable age option that is based on the birthdate and/or an age for the user associated with the second user account (e.g., the first selectable option is an age of the user associated with the second user account). In some embodiments, the value (e.g., the age, birthdate) of the first selectable age option is adjustable and can be adjusted via one or more user inputs.

In some embodiments, after modifying the first indication to indicate the second access level that is based on the second set of content access criteria, the computer system (e.g., 600) completes the process to create the second user account (e.g., 626), wherein access to the first type of content by the second user account is based on the second access level (e.g. "Age 8" in 628c) (e.g., the second user account cannot access content that does not meet the second access level).

In some embodiments, the computer system (e.g., 600) displays, in the access-setting user interface (e.g., 618), a second indication of a currently selected content access level for a second type of content (e.g., 618d), different from the first type of content (e.g., 618c), wherein the second indi-cation indicates, at the time the second set of one or more inputs is detected, that the second type of content has a third access level (e.g., "G" of 618d in FIG. 6F). In some embodiments, the computer system (e.g., 600), in response to the second set of one or more inputs, modifies the second indication to indicate a fourth access level (e.g., "PG" of 618d in FIG. 6G), different from the third access level, for the second type of content (e.g., updating the access level for a movie content type from G to PG), wherein the fourth access level is based on the second set of content access criteria (e.g., 620a). Modifying access levels for several different content types using the same selectable option allows a user to adjust content access levels during an account creation process, without requiring a complicated set of controls, which provides the user with additional control options without cluttering the UI with additional displayed controls.

In some embodiments, after modifying the first indication (e.g., 618a) to indicate the second access level and modi-fying the second indication (e.g., 618d) to indicate the fourth access level, the computer system (e.g., 600) detects a third set of one or more inputs that includes a second input (e.g., 650h) corresponding to the first indication (e.g., the first indication is an affordance). In some embodiments, in response to detecting the third set of one or more inputs, the computer system (e.g., 600) modifies the first indication to indicate a fifth access level (e.g., "5+" of 618a in FIG. 6I) (e.g., a manually set access level that is modified from and not dependent on the second selectable option) that is not based on the second set of content access criteria (e.g., "Age 8" of 620*a*) (in some embodiments, and not based on the first set of content access criteria) and maintaining the second indication (e.g., 618*d*) as indicating the fourth access level (e.g., the first and second indications can be directly and independently modified). In some embodiments, manually modifying the first indication to indicate the fifth access level, the modification can be undone (e.g., reverting back to the access level that is based on the second set of access criteria, via selection of an undo option. In some embodiments, the undo option is displayed only after a manual modification is made). Configuring the indications to be directly and independently modifiable allows the user a greater degree of control of access levels, which decreases the number of inputs required to configure a target level of access control for multiple content type, which makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the access-setting user interface, computer system (e.g., 600) receives data (e.g., via inputs provided at the computer system; from an external computer system) corresponding to a location (e.g., the location of the computer system; a location of a user of the second account; and/or an intended location at which the second account will be used) (in some embodiments, the location corresponds to a nation/national entity (e.g., France, the United States) or a regional entity (e.g., the European Union)). In some embodiments, in accordance with the location being a first location (e.g., the United States), the first set of content access criteria (in some embodiments, and/or the second set of content access criteria) is a third set of content access criteria. In some embodiments, in accordance with the location being a second location (e.g., France), the first set of content access criteria (in some embodiments, and/or the second set of content access criteria) is a fourth set of content access criteria that is different from the third set of content access criteria. In some embodiments, the first set of content access criteria is selected base on location/nationality data (e.g., based on national guidelines for content access by age). Selecting content access criteria based on location/nationality allows the computer system to perform an operation (e.g., adapting/localizing the criteria) when a set of conditions has been met without requiring further user input.

In some embodiments, the computer system (e.g., 600) displays, in the access-setting user interface (e.g., 618), a third indication of a currently selected functionality access level for a first type of functionality (e.g., application access functionality; time-of-access functionality; creation, modification, installation, and/or deletion functionality (e.g., for documents, media, and/or applications)), wherein the third indication, at the time the second set of one or more inputs is detected, indicates that the first type of functionality has a sixth access level; and in response to the second set of one or more inputs, the computer system (e.g., 600) modifies the third indication to indicate a seventh access level, different from the sixth access level, for the first type of functionality (e.g., updating the access level for amount of permitted device time per day), wherein the seventh access level is based on the second set of content access criteria. In some embodiments, the plurality of selectable options can also be used to manage access criteria for functionalities for the second user account. In some embodiments, the first type of functionality includes the ability for the user of the second user account to modify location sharing settings of the second user account. Modifying an access level for a functionality based on selection of an option from among a plurality of selectable options that correspond to predetermined access criteria allows a user to adjust functionality access levels during an account creation process, without requiring a complicated set of controls, which provides the user with additional control options without cluttering the user interface with additional displayed controls.

In some embodiments, during the process to create the second user account, the computer system (e.g., 600) automatically (e.g., without user input selecting a specific email address) generates an email address (e.g., 616*a*) (e.g., an email address that is not directly selected by the user of the computer system) that is associated with the second user account. In some embodiments, an option is provided to enter and associate an existing email address (e.g., a manually entered email address) with the second user account.

In some embodiments, after completing the process to create the second user account and while the second user account is active on the computer system, the computer system (e.g., 600) detects a first request for access privileges for access-controlled content and/or an access-controlled function (e.g., a request for access to content or functions that were restricted via selections made via the access-setting user interface); in response to detecting the first request, the computer system (e.g., 600) generates a message (e.g., 642) (e.g., a text in a messaging application) to the first account that includes an indication of the first request (e.g., 642*a*, 642*b*, 642*c*) (e.g., one or more details of the first request). In some embodiments, in accordance with a determination that the second account is associated with a plurality of guardian accounts, including the first account, the message is generated in a message conversation that includes the plurality of guardian accounts. In some embodiments, the request is a request to make a purchase (e.g., of an application, of a service) and the indication includes an indication of cost/price. In some embodiments, the request is a request for additional access time (e.g., to one or more functions).

In some embodiments, the message (e.g., 642*a*), when displayed on an external computer system on which the first account is active, includes a selectable option to approve (e.g., 644) the first request and a selectable option to deny (e.g., 643) the first request. Including options to approve or deny the first request directly in the message reduces the number of inputs required to respond to the request, which provides additional control options without requiring additional inputs and/or navigation to different user interfaces, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first request, generating a notification (e.g., 640*a*, 640*b*, 640*c*) for the first account that includes an indication of the first request, wherein the notification, when displayed on an external computer system on which the first account is active, includes a selectable option to approve the first request (e.g., 640*ba*) and a selectable option to deny (e.g., 640*bb*) the first request. In some embodiments, providing an input of a first type (e.g., touch and hold, a swipe) that corresponds to the notification causes the external computer system to display a user interface that includes a set of details of usage (e.g., in a given period of time) and/or access history for the second user account.

In some embodiments, after completing the process to create the second user account and while the first user account is active on the computer system, the computer system (e.g., 600) displays a contactable-user user interface that includes an indication of the second account (e.g., 604*a*, 604*b*) (e.g., a contact card and/or contact icon associated with the second account), wherein the indication of the second account includes an indicator of a current access mode (e.g., 604*c*) (e.g., a mode during which different levels of access controls are in effect (e.g., sleep period mode; an education period mode; a primary/default access mode)) of the second user account. Displaying the contactable-user user interface that includes the indication of the second account provides the user of the first account with improved feedback as to the access mode status of the second user account.

In some embodiments, the indication of the second account (e.g., 604*a*) is a selectable option (e.g., an affordance). In some embodiments, the computer system (e.g., 600) detects a third input (e.g., 650*za*) corresponding to the indication of the second account; and in response to detecting the third input, the computer system (e.g., 600) displays one or more options (e.g., 646*a*) for modifying the current access mode of the second user account.

In some embodiments, after completing the process to create the second user account, the first user account (e.g., 628*a*) and the second user account (e.g., 628*b*, 628*c*, 628*d*) are associated accounts with a predefined relationship (e.g., associated as a family; associated together in a family account) (e.g., 628) and a first service and/or first subscription (e.g., 628*g*) (e.g., that grants access to content (e.g., media) and/or applications) that is primarily associated with the first account is accessible to the second user account (e.g., 638*i*), based on the first user account and the second user account being associated accounts with the predetermined relationship. In some embodiments, a third user account is associated with the first account and the second account, wherein the third user account does not have access restrictions (e.g., the third user account and the first user account are guardian/parent accounts of the family).

In some embodiments, the computer system (e.g., 600) receives a request (e.g., 650*o*) to invite a third user account (e.g., 630*c*) to be associated with the first and second user accounts with the predefined relationship (e.g., 630); and the computer system (e.g., 600) sends an invitation (e.g., 632*a*) to the third user account (e.g., the user account associated with computer system 600') that includes an indication (e.g., a graphical and/or textual indication) of the first service and/or first subscription (e.g., the content listed in 632*a* and 632*a'* in FIG. 6Q) that will be shared with the third user account if the invitation is accepted. In some embodiments, prior to receiving the request to invite the third user account, displaying one or more suggested user accounts (e.g., emergency contacts, beneficiaries, individuals sharing a surname and/or home address) to invite. Sending an invitation that includes the indication of the first service and/or first subscription allows the computer system to perform an operation (including the indication in the invitation) when a set of conditions (receiving the request) has been met without requiring further user input and also provides improved feedback.

In some embodiments, while the first user account is active on the computer system, the computer system (e.g., 600) detects a fourth set of one or more inputs (e.g., 650*ac*,

650*ad*, 650*ae*) corresponding to a request to share one or more passwords (e.g., 656*b*, 656*c*, 656*d*, 656*e*) with one or more user accounts (e.g., 654*b*, 654*c*, 654*d*) that have the predefined relationship with the first account (e.g., 654*e*) (in some embodiments, all accounts having the predefined relationship or only a subset of such accounts); and in response to detecting the fourth set of one or more inputs, the computer system (e.g., 600) shares the one or more passwords with the one or more user accounts that have the predefined relationship with the first account (e.g., 652*c*).

In some embodiments, while the first account is active on the computer system and after completing the process to create a second user account: in accordance with a determination that set of one or more review criteria are met, the computer system (e.g., 600) displays a review user interface (e.g., 638) that includes: one or more indications (e.g., 638*g*-638*w*) of a current access level for the first type of content that controls access to the first type of content by the second user account; and one or more selectable options (e.g., 638*g*-638*w*) for modifying the current access level for the first type of content that controls access to the first type of content by the second user account. In some embodiments, the set of one or more review criteria includes a criterion that is met when period of time has elapsed (e.g., a year since the second account was created) and/or a current date matches a predetermined date (e.g., the birthday of the user of the second account). In some embodiments, the review user interface includes prompts to review and/or update one or more of location sharing with family members, services and/or subscription sharing, and/or recovery contact information. Displaying the review user interface when the set of one or more review criteria are met allows the computer system to perform an operation when a set of conditions has been met without requiring further user input.

In some embodiments, during the process to create the second user account, the computer system (e.g., 600) configures the second user account (e.g., 622) to allow signing into the second user account (e.g., 650*k* at 622*b*) via an approval from the first user account; after completing the process to create the second user account, the computer system (e.g., 600) receives a second request (e.g., 640*b*) from an external computer system to approve signing into the external computer system with the second user account; and in response to receiving the second request, the computer system (e.g., 600) displays one or more options to approve (e.g., 640*ba*) or deny the request (e.g., 640*bb*). In some embodiments, a password or passcode for signing into the second user account is associated with the first user account (e.g., stored on a device or password management system account associated with the first user account) without being stored on a device or password management system account associated with the second user account.

In some embodiments, during the process to create a second user account, the computer system (e.g., 600) completes a verification process (e.g., 614) (e.g., to confirm adult age (e.g., 18 or older)) for a user associated with the first user account.

In some embodiments, the third user account (e.g., 630*c*) associated with the first and second user accounts with the predefined relationship (e.g., 630) is a guardian (e.g., legal guardian, and/or not a parent).

In some embodiments, the computer system (e.g., 600) detects an external computer system (e.g., via one or more wireless communication methods) and, in response, initiates the process to create a second user account (e.g., 610*e*).

In some embodiments, user accounts that are associated accounts with the predefined relationship share location (e.g., 628h, 638k) of the computer system (e.g., 600) associated with each user account. In some embodiments, each user account can individually manage (e.g., enable, and/or disable) sharing of the computer system (e.g., 600) location with other user accounts.

In some embodiments, while displaying a user interface (e.g., 628) for managing user accounts with the predefined relationship, the computer system (e.g., 600) detects a fifth set of one or more inputs (e.g., corresponding to selection of 628b, 628c), and in response to detecting the fifth set of one or more inputs, the computer system (e.g., 600) displays a user interface (e.g., 638) for managing the second user account.

In some embodiments, while displaying a settings user interface (e.g., 648), the computer system (e.g., 600) detects a sixth set of one or more inputs corresponding to a settings affordance (e.g., 648d) and, in response, the computer system (e.g., 600) displays a configuration user interface (e.g., screen time allowance settings).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of user accounts. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to manage user accounts. Accordingly, use of such personal information data enables users to have calculated control of the user accounts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing user accounts, the present technology can be configured to allow users to select to "opt in" or "opt out" of participation in the collection of personal information data during registration for services or anytime thereafter. In another example, users can select not to provide personal usage data for managed user accounts. In yet another example, users can select to limit the length of time personal data is maintained or entirely prohibit the development of a managed user account. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and settings suggestions can be selected and delivered to users by inferring preferences based on non-personal information data or a bare minimum amount of personal information, such as the content being requested by the device associated with a user, other non-personal information available to the computer system, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

while a first user account is active on the computer system, detecting, via the one or more input devices, a first set of one or more inputs corresponding to a request to initiate a process to create a second user account;

in response to the first set of one or more inputs, initiating the process to create the second user account;

during the process to create the second user account:

displaying, via the display generation component, an access-setting user interface that includes a plurality of selectable age options for setting content access criteria, wherein the access-setting user interface includes:

a first selectable age option of the plurality of selectable age options that corresponds to a first set of content access criteria;

a second selectable age option of the plurality of selectable age options that corresponds to a second set of content access criteria, different from the first set of content access criteria; and a first indication of a currently selected content access level for a first type of content;

while the first selectable age option is selected and while the first indication indicates that the first type of content has a first access level that is based on the first set of content access criteria, detecting, via the one or more input devices, a second set of one or more inputs that includes a first input corresponding to selection of the second selectable age option;

in response to the second set of one or more inputs:

selecting the second selectable age option; and modifying the first indication to indicate a second access level, different from the first access level, for the first type of content, wherein the second access level is a predetermined access level based on the second set of content access criteria corresponding to the second selectable age option; and configuring the second user account to allow signing into the second user account via an approval from the first user account;

after completing the process to create the second user account, receiving a second request from an external computer system to approve signing into the external computer system with the second user account; and in response to receiving the second request, displaying one or more options to approve or deny the request.

2. The computer system of claim 1, the one or more programs further including instructions for:

during the process to create the second user account and prior to displaying the access-setting user interface, receiving data corresponding to a birthdate and/or age for a user associated with the second user account; and wherein the first selectable age option is based on the birthdate and/or an age for the user associated with the second user account.

3. The computer system of claim 1, the one or more programs further including instructions for:

after modifying the first indication to indicate the second access level that is based on the second set of content access criteria, completing the process to create the second user account, wherein access to the first type of content by the second user account is based on the second access level.

4. The computer system of claim 1, the one or more programs further including instructions for:

displaying, in the access-setting user interface, a second indication of a currently selected content access level for a second type of content, different from the first type of content, wherein the second indication indicates, at the time the second set of one or more inputs is detected, that the second type of content has a third access level; and in response to the second set of one or more inputs, modifying the second indication to indicate a fourth access level, different from the third access level, for the second type of content, wherein the fourth access level is based on the second set of content access criteria.

5. The computer system of claim 1, the one or more programs further including instructions for:

prior to displaying the access-setting user interface, receiving data corresponding to a location, wherein:

in accordance with the location being a first location, the first set of content access criteria is a third set of content access criteria; and in accordance with the location being a second location, the first set of content access criteria is a fourth set of content access criteria that is different from the third set of content access criteria.

6. The computer system of claim 1, the one or more programs further including instructions for:

displaying, in the access-setting user interface, a third indication of a currently selected functionality access level for a first type of functionality, wherein the third indication, at the time the second set of one or more inputs is detected, indicates that the first type of functionality has a sixth access level; and in response to the second set of one or more inputs, modifying the third indication to indicate a seventh access level, different from the sixth access level, for the first type of functionality, wherein the seventh access level is based on the second set of content access criteria.

7. The computer system of claim 1, the one or more programs further including instructions for:

during the process to create the second user account, automatically generating an email address that is associated with the second user account.

8. The computer system of claim 1, the one or more programs further including instructions for:

after completing the process to create the second user account and while the second user account is active on the computer system, detecting a first request for access privileges for access-controlled content and/or an access-controlled function; and in response to detecting the first request, generating a message to the first user account that includes an indication of the first request.

9. The computer system of claim 1, the one or more programs further including instructions for:

after completing the process to create the second user account and while the first user account is active on the computer system, displaying a contactable-user user interface that includes an indication of the second user account, wherein the indication of the second user account includes an indicator of a current access mode of the second user account.

10. The computer system of claim 1, wherein, after completing the process to create the second user account, the first user account and the second user account are associated accounts with a predefined relationship and a first service and/or first subscription that is primarily associated with the first user account is accessible to the second user account, based on the first user account and the second user account being associated accounts with the predefined relationship.

11. The computer system of claim 1, the one or more programs further including instructions for:

while the first user account is active on the computer system and after completing the process to create a second user account:

in accordance with a determination that set of one or more review criteria are met, displaying a review user interface that includes:

one or more indications of a current access level for the first type of content that controls access to the first type of content by the second user account; and one or more selectable age options for modifying the current access level for the first type of content that controls access to the first type of content by the second user account.

12. A non-transitory computer-readable storage medium storing one or more programs configured to be executed by one or more processors of a computer system that is in communication with a display generation component and one or more input devices, the one or more programs including instructions for:

while a first user account is active on the computer system, detecting, via the one or more input devices, a first set of one or more inputs corresponding to a request to initiate a process to create a second user account;

in response to the first set of one or more inputs, initiating the process to create the second user account;

during the process to create the second user account:

displaying, via the display generation component, an access-setting user interface that includes a plurality of selectable age options for setting content access criteria, wherein the access-setting user interface includes:

a first selectable age option of the plurality of selectable age options that corresponds to a first set of content access criteria;

a second selectable age option of the plurality of selectable age options that corresponds to a second set of content access criteria, different from the first set of content access criteria; and a first indication of a currently selected content access level for a first type of content;

while the first selectable age option is selected and while the first indication indicates that the first type of content has a first access level that is based on the first set of content access criteria, detecting, via the one or more input devices, a second set of one or more inputs that includes a first input corresponding to selection of the second selectable age option;

in response to the second set of one or more inputs:

selecting the second selectable age option; and modifying the first indication to indicate a second access level, different from the first access level, for the first type of content, wherein the second access level is a predetermined access level based on the second set of content access criteria corresponding to the second selectable age option; and configuring the second user account to allow signing into the second user account via an approval from the first user account;

after completing the process to create the second user account, receiving a second request from an external computer system to approve signing into the external computer system with the second user account; and in response to receiving the second request, displaying one or more options to approve or deny the request.

13. The non-transitory computer-readable storage medium of claim 12, the one or more programs further including instructions for:

during the process to create the second user account and prior to displaying the access-setting user interface, receiving data corresponding to a birthdate and/or age for a user associated with the second user account; and wherein the first selectable age option is based on the birthdate and/or an age for the user associated with the second user account.

14. The non-transitory computer-readable storage medium of claim 12, the one or more programs further including instructions for:

after modifying the first indication to indicate the second access level that is based on the second set of content access criteria, completing the process to create the second user account, wherein access to the first type of content by the second user account is based on the second access level.

15. The non-transitory computer-readable storage medium of claim 12, the one or more programs further including instructions for:

displaying, in the access-setting user interface, a second indication of a currently selected content access level for a second type of content, different from the first type of content, wherein the second indication indicates, at the time the second set of one or more inputs is detected, that the second type of content has a third access level; and in response to the second set of one or more inputs, modifying the second indication to indicate a fourth access level, different from the third access level, for the second type of content, wherein the fourth access level is based on the second set of content access criteria.

16. The non-transitory computer-readable storage medium of claim 12, the one or more programs further including instructions for:

prior to displaying the access-setting user interface, receiving data corresponding to a location, wherein:

in accordance with the location being a first location, the first set of content access criteria is a third set of content access criteria; and in accordance with the location being a second location, the first set of content access criteria is a fourth set of content access criteria that is different from the third set of content access criteria.

17. The non-transitory computer-readable storage medium of claim 12, the one or more programs further including instructions for:

displaying, in the access-setting user interface, a third indication of a currently selected functionality access level for a first type of functionality, wherein the third indication, at the time the second set of one or more inputs is detected, indicates that the first type of functionality has a sixth access level; and in response to the second set of one or more inputs, modifying the third indication to indicate a seventh access level, different from the sixth access level, for the first type of functionality, wherein the seventh access level is based on the second set of content access criteria.

18. The non-transitory computer-readable storage medium of claim 12, the one or more programs further including instructions for:

during the process to create the second user account, automatically generating an email address that is associated with the second user account.

19. The non-transitory computer-readable storage medium of claim 12, the one or more programs further including instructions for:

after completing the process to create the second user account and while the second user account is active on the computer system, detecting a first request for access privileges for access-controlled content and/or an access-controlled function; and in response to detecting the first request, generating a message to the first user account that includes an indication of the first request.

20. The non-transitory computer-readable storage medium of claim 12, the one or more programs further including instructions for:

after completing the process to create the second user account and while the first user account is active on the computer system, displaying a contactable-user user interface that includes an indication of the second user account, wherein the indication of the second user account includes an indicator of a current access mode of the second user account.

21. The non-transitory computer-readable storage medium of claim 12, wherein, after completing the process to create the second user account, the first user account and the second user account are associated accounts with a predefined relationship and a first service and/or first subscription that is primarily associated with the first user account is accessible to the second user account, based on the first user account and the second user account being associated accounts with the predefined relationship.

22. The non-transitory computer-readable storage medium of claim 12, the one or more programs further including instructions for:

while the first user account is active on the computer system and after completing the process to create a second user account:

in accordance with a determination that set of one or more review criteria are met, displaying a review user interface that includes:

one or more indications of a current access level for the first type of content that controls access to the first type of content by the second user account; and one or more selectable age options for modifying the current access level for the first type of content that controls access to the first type of content by the second user account.

23. A method comprising:

at a computer system that is in communication with a display generation component and one or more input devices:

while a first user account is active on the computer system, detecting, via the one or more input devices, a first set of one or more inputs corresponding to a request to initiate a process to create a second user account;

in response to the first set of one or more inputs, initiating the process to create the second user account;

during the process to create the second user account:

displaying, via the display generation component, an access-setting user interface that includes a plurality of selectable age options for setting content access criteria, wherein the access-setting user interface includes:

a first selectable age option of the plurality of selectable age options that corresponds to a first set of content access criteria;

a second selectable age option of the plurality of selectable age options that corresponds to a second set of content access criteria, different from the first set of content access criteria; and a first indication of a currently selected content access level for a first type of content;

while the first selectable age option is selected and while the first indication indicates that the first type of content has a first access level that is based on the first set of content access criteria, detecting, via the one or more input devices, a second set of one or more inputs that includes a first input corresponding to selection of the second selectable age option;

in response to the second set of one or more inputs:

selecting the second selectable age option; and modifying the first indication to indicate a second access level, different from the first access level, for the first type of content, wherein the second access level is a predetermined access level based on the second set of content access criteria corresponding to the second selectable age option; and configuring the second user account to allow signing into the second user account via an approval from the first user account;

after completing the process to create the second user account, receiving a second request from an external computer system to approve signing into the external computer system with the second user account; and in response to receiving the second request, displaying one or more options to approve or deny the request.

24. The method of claim 23, further comprising:

during the process to create the second user account and prior to displaying the access-setting user interface, receiving data corresponding to a birthdate and/or age for a user associated with the second user account; and wherein the first selectable age option is based on the birthdate and/or an age for the user associated with the second user account.

25. The method of claim 23, further comprising:

after modifying the first indication to indicate the second access level that is based on the second set of content access criteria, completing the process to create the second user account, wherein access to the first type of content by the second user account is based on the second access level.

26. The method of claim 23, further comprising:

displaying, in the access-setting user interface, a second indication of a currently selected content access level for a second type of content, different from the first type of content, wherein the second indication indicates, at the time the second set of one or more inputs is detected, that the second type of content has a third access level; and in response to the second set of one or more inputs, modifying the second indication to indicate a fourth access level, different from the third access level, for the second type of content, wherein the fourth access level is based on the second set of content access criteria.

27. The method of claim 23, further comprising:

prior to displaying the access-setting user interface, receiving data corresponding to a location, wherein:

in accordance with the location being a first location, the first set of content access criteria is a third set of content access criteria; and in accordance with the location being a second location, the first set of content access criteria is a fourth set of content access criteria that is different from the third set of content access criteria.

28. The method of claim 23, further comprising:

displaying, in the access-setting user interface, a third indication of a currently selected functionality access level for a first type of functionality, wherein the third indication, at the time the second set of one or more inputs is detected, indicates that the first type of functionality has a sixth access level; and in response to the second set of one or more inputs, modifying the third indication to indicate a seventh access level, different from the sixth access level, for the first type of functionality, wherein the seventh access level is based on the second set of content access criteria.

29. The method of claim 23, further comprising:

during the process to create the second user account, automatically generating an email address that is associated with the second user account.

30. The method of claim 23, further comprising:

after completing the process to create the second user account and while the second user account is active on the computer system, detecting a first request for access privileges for access-controlled content and/or an access-controlled function; and in response to detecting the first request, generating a message to the first user account that includes an indication of the first request.

31. The method of claim 23, further comprising:

after completing the process to create the second user account and while the first user account is active on the computer system, displaying a contactable-user user interface that includes an indication of the second user account, wherein the indication of the second user account includes an indicator of a current access mode of the second user account.

32. The method of claim 23, wherein, after completing the process to create the second user account, the first user account and the second user account are associated accounts with a predefined relationship and a first service and/or first subscription that is primarily associated with the first user account is accessible to the second user account, based on the first user account and the second user account being associated accounts with the predefined relationship.

33. The method of claim 23, further comprising:

while the first user account is active on the computer system and after completing the process to create a second user account:

in accordance with a determination that set of one or more review criteria are met, displaying a review user interface that includes:

one or more indications of a current access level for the first type of content that controls access to the first type of content by the second user account; and one or more selectable age options for modifying the current access level for the first type of content that controls access to the first type of content by the second user account.

\* \* \* \* \*